(12) United States Patent
Warden et al.

(10) Patent No.: US 11,625,745 B1
(45) Date of Patent: Apr. 11, 2023

(54) VEHICLE TELEMATICS SYSTEM TO PROMOTE GOOD DRIVING BEHAVIOR USING POSITIVE FEEDBACK AND AWARD POINTS

(71) Applicant: Allstate Insurance Company, Northbrook, IL (US)

(72) Inventors: Thomas Michael Warden, Belmont, CA (US); Daniel Kraft, Libertyville, IL (US); Nathan M. Bryer, Arlington Heights, IL (US); Eric Huls, Chicago, IL (US); Margaret A. Brinkmann, Palo Alto, CA (US)

(73) Assignee: Allstate Insurance Company, Northbrook, IL (US)

( * ) Notice: Subject to any disclaimer, the term of this patent is extended or adjusted under 35 U.S.C. 154(b) by 230 days.

(21) Appl. No.: 13/905,116

(22) Filed: May 29, 2013

Related U.S. Application Data

(60) Provisional application No. 61/747,895, filed on Dec. 31, 2012.

(51) Int. Cl.
G06Q 30/02 (2012.01)
G06Q 30/0226 (2023.01)

(52) U.S. Cl.
CPC .............................. *G06Q 30/0226* (2013.01)

(58) Field of Classification Search
CPC ........... G06Q 30/0207; G06Q 30/0209; G06Q 30/0224; G06Q 30/0226; G06Q 30/0231; G06Q 30/0251; G06Q 30/0255
See application file for complete search history.

(56) References Cited

U.S. PATENT DOCUMENTS

| 3,748,580 | A  | * | 7/1973 | Stevens et al. | 324/178 |
| 6,225,896 | B1 | * | 5/2001 | Sendowski | 340/467 |
| 6,629,029 | B1 |   | 9/2003 | Giles | |
| 7,339,483 | B1 |   | 3/2008 | Farmer | |
| 7,389,178 | B2 |   | 6/2008 | Raz et al. | |
| 7,561,054 | B2 |   | 7/2009 | Raz et al. | |

(Continued)

OTHER PUBLICATIONS

Non-Final Office Action dated Apr. 30, 2015—U.S. Appl. No. 13/905,118.

(Continued)

*Primary Examiner* — Ilana L Spar
*Assistant Examiner* — Allan J Woodworth, II
(74) *Attorney, Agent, or Firm* — Polsinelli PC

(57) ABSTRACT

A system and method are disclosed to promote good driving among users. A user-customizable good driving (GD) wish list may be created, populated, modified, and/or used to promote good driving. The GD wish list may be used in conjunction with a vehicle telematics unit (VTU) to monitor, process, detect, and/or record good driving events, and communicate and/or generate positive feedback for the user. In addition to positive feedback, good driving (GD) points may be accumulated based on driving behavior. The accumulated GD points may be used in conjunction with a product and/or service offering, such as by an insurance company. Furthermore, in some examples, the system encourages users to promote good driving behavior by pledging themselves to a challenging GD wish list that will earn them more GD points and the associated benefits.

20 Claims, 9 Drawing Sheets

(56) References Cited

U.S. PATENT DOCUMENTS

| | | | |
|---|---|---|---|
| 7,663,495 B2 | 2/2010 | Haque et al. | |
| 7,692,552 B2 | 4/2010 | Harrington et al. | |
| 7,715,961 B1 | 5/2010 | Kargupta | |
| 8,090,598 B2 | 1/2012 | Bauer et al. | |
| 8,116,971 B2 | 2/2012 | Chen et al. | |
| 2004/0030458 A1* | 2/2004 | Entenmann | 701/1 |
| 2004/0224742 A1* | 11/2004 | Chudley | A63F 13/12 463/6 |
| 2005/0234772 A1* | 10/2005 | Haruki | G06Q 50/06 340/905 |
| 2007/0001831 A1* | 1/2007 | Raz et al. | 340/439 |
| 2008/0255888 A1 | 10/2008 | Berkobin et al. | |
| 2008/0262670 A1 | 10/2008 | McClellan et al. | |
| 2008/0319602 A1 | 12/2008 | McClellan et al. | |
| 2009/0024419 A1* | 1/2009 | McClellan | G06Q 40/08 705/4 |
| 2009/0091439 A1* | 4/2009 | Sekiyama | G08G 1/127 340/459 |
| 2009/0210257 A1* | 8/2009 | Chalfant | B60W 40/09 705/4 |
| 2010/0106370 A1 | 4/2010 | Lu et al. | |
| 2010/0106603 A1 | 4/2010 | Dey et al. | |
| 2010/0274440 A1* | 10/2010 | Kim et al. | 701/33 |
| 2011/0281564 A1 | 11/2011 | Armitage et al. | |
| 2012/0025969 A1 | 2/2012 | Dozza | |
| 2012/0089423 A1 | 4/2012 | Tamir et al. | |
| 2012/0123806 A1* | 5/2012 | Schumann, Jr. | G06Q 40/08 705/4 |
| 2012/0185282 A1* | 7/2012 | Gore et al. | 705/4 |
| 2013/0066688 A1* | 3/2013 | Pinkus | G06Q 10/0639 705/7.41 |
| 2013/0090821 A1* | 4/2013 | Abboud | G07C 5/085 701/123 |
| 2013/0141249 A1* | 6/2013 | Pearlman et al. | 340/870.03 |
| 2013/0282149 A1* | 10/2013 | Kuntagod | H04W 4/70 700/73 |
| 2014/0142805 A1* | 5/2014 | Frye | 701/36 |

OTHER PUBLICATIONS

Non-Final Office Action dated Apr. 23, 2015—U.S. Appl. No. 13/905,124.

An In-Vehicle Data Recorder for Evaluation of Driving Behavior and Safety, Tsippy Lotan, Or Yarok, and Tomer Toledo, TRB 2006 Annual Meeting CD-Rom, 14 pages.

Onboard Monitoring for Truck Safety: From Concept to Prototype to Field Operational Test, Jim Misener, et al., Intellimotion, vol. 12, No. 2, 2006, 16 pages.

In-Vehicle Data recorders for monitoring and feedback on drivers' behavior, Tomer Toledo, Oren Musicant, and Tsippy Lotan, http://www.sciencedirect.com/science/article/pii/SO968090X08000041, uploaded May 11, 2012, three pages.

An Israeli diagnosis for bad driving, posted on Jan. 2, 2005, Copyright © 2012 Israel, Israel21c-http://israel 21c.org, 2 pages.

CarChip Pro Brochure, From the road to your PC, All-in-One Driving & Engine Performance Monitor, Jul. 2007, 2 pages.

Nissan Says Future of Vehicle Safety Lies in Vehicle-to-Vehicle Communications Technology, Mar. 19, 2012, Copyright © 2012 Automotive Fleet, 1 page.

Telematics, UBI, and driver education, posted by James on Jul. 31, 2013, Telematics Update, analysis.telematicsupdate.com/print/35543, 3 pages.

* cited by examiner

| Category | Characteristic | Type | One illustrative sensor unit |
|---|---|---|---|
| weather | rain | Continuous-type | water sensor on vehicle windshield |
| weather | snow | Continuous-type | remote server accessing weather data source |
| weather | hail | Continuous-type | remote server accessing weather data source |
| weather | sunny | Continuous-type | remote server accessing weather data source |
| weather | cloudy | Continuous-type | remote server accessing weather data source |
| weather | windy | Continuous-type | remote server accessing weather data source |
| weather | temperature | Continuous-type | external thermometer |
| traffic | congestion | Continuous-type | remote server accessing traffic data source |
| traffic | construction | Continuous-type | remote server accessing traffic data source |
| road rules | speed limit | Continuous-type | remote server accessing map data source |
| road rules | stop sign | Continuous-type | remote server accessing map data source |
| location | coordinate | Continuous-type | GPS receiver unit |
| location | parking lot | Continuous-type | remote server accessing map data source |
| location | alley | Continuous-type | remote server accessing map data source |
| location | highway | Continuous-type | remote server accessing map data source |
| location | off-road | Continuous-type | remote server accessing map data source |
| location | zip code | Continuous-type | remote server accessing map data source |
| time | time of day | Instantaneous-type | clock/timer unit |
| time | day of week | Continuous-type | remote server accessing data source |
| time | month | Continuous-type | remote server accessing data source |
| time | daylight | Continuous-type | remote server accessing data source |
| time | nighttime | Continuous-type | remote server accessing data source |
| driving | braking | Instantaneous-type | accelerometer unit |
| driving | acceleration | Instantaneous-type | accelerometer unit |
| driving | speed | Instantaneous-type | onboard diagnostic (OBDII) speed sensor |
| driving | steering | Instantaneous-type | accelerometer unit |
| driving | lane change | Instantaneous-type | accelerometer unit |
| driving | lateral movement | Instantaneous-type | accelerometer unit |
| driving | driven miles | Instantaneous-type | onboard diagnostic (OBDII) odometer |
| driving | driving minutes | Instantaneous-type | timer unit |
| driving | tailgate | Instantaneous-type | proximity sensor unit |
| vehicle | engine temperature | Instantaneous-type | onboard diagnostic (OBDII) temperature sensor |
| vehicle | tire pressure | Instantaneous-type | onboard diagnostic (OBDII) pressure sensor |
| driver | fatigue | Instantaneous-type | retinal/blink rate sensor |
| driver | intoxication | Continuous-type | breathalyzer unit |
| driver | seat belt | Continuous-type | seat belt sensor |
| driver | passenger | Continuous-type | weight sensor |
| driver | music/noise | Instantaneous-type | microphone sensor |
| driver | cell phone usage | Instantaneous-type | RF detection sensor |

Fig. 5

VEHICLE TELEMATICS SYSTEM TO PROMOTE GOOD DRIVING BEHAVIOR USING POSITIVE FEEDBACK AND AWARD POINTS

This application claims priority from U.S. Provisional Application Ser. No. 61/747,895, which was filed on Dec. 31, 2012, and the entirety of which is herein incorporated by reference.

TECHNICAL FIELD

Aspects of the disclosure relate generally to promoting good driving behavior. More particularly, aspects of the disclosure relate to a vehicle telematics system with a good driving wish list to promote good driving behavior.

DESCRIPTION OF THE RELATED ART

Telematics includes the use of technology to communicate information from one location to another. Telematics has been used for various applications, including for the exchange of information with electronic sensors. As telematics technology has progressed, various communication methodologies have been incorporated into automobiles and other types of vehicles. Telematics systems such as on-board diagnostics (OBD) systems may be used in automobiles and other vehicles. OBD systems may provide information from the vehicle's on-board computers and sensors, allowing users to monitor a wide variety of information relating to the vehicle systems, such as engine RPM, emissions control, coolant temperature, vehicle speed, throttle position, and oxygen sensing, and other types of data. Telematics devices installed within vehicles may be configured to access the vehicle computers and sensor data, and transmit the data to a display within the vehicle, a personal computer or mobile device, or to a centralized data processing system. Data obtained from OBD systems has been used for a variety of purposes, including maintenance, diagnosis, and analysis.

Some telematics systems and programs are known to collect data about how a car is driven, analyze that data, and provide feedback based on that analysis. Such telematics systems and programs may also build a profile of a car based on the collected, analyzed data. This driving profile may assist the provider of the telematics program in assessing the risk of a potential incident occurring to the car. Such telematics systems provide generic feedback to the driver of the car about when poor driving behavior was identified. There exist numerous in-vehicle telematics units that detect and record poor driving events (e.g., harsh braking, excessive speed, and hard steering at high speeds). Some such conventional systems rely on negative messages and violation alerts to remediate bad driving behavior. Moreover, if the feedback is provided in real-time in the car, it may distract the driver. Distracted driving could be detrimental to safe driving. In addition, some auto insurance companies offer programs giving customers a discount for having vehicles that are accident free for a period of time. Such programs are myopic in their overall evaluation of their customers' driving behavior. The aforementioned features have various drawbacks and limitations.

SUMMARY OF THE DISCLOSURE

Various approaches to promoting good driving behavior are presented. In accordance with various aspects of the disclosure, a vehicle telematics unit (VTU) configured for customization by a user-defined good driving (GD) wish list and for installation in a user's vehicle is disclosed. The GD wish list may comprise one or more user-selected combinations of one or more characteristics of driving behavior and corresponding user-provided values. A remote good driving analysis server may assign a GD point value to the user-selected combination based on various factors. Based on the GD wish list, the VTU may monitor the user's driving behavior using one or more sensor units. In some examples, sensor units may be activated or deactivated based on processing of records in the user's GD wish list. If the VTU may detect that the monitored driving behavior meets the requirements corresponding to records in the GD wish list, in some examples, the VTU may cause the user's account to be credited with GD points. In some examples, the VTU may promote good driving behavior by generating a positive message for perception in the user's vehicle based on the user's accumulation of GD points.

Furthermore, in some examples, the system disclosed herein may result in a favorable situation where a first vehicle telematics unit customized with a GD wish list with more challenging requirements accumulates more GD points than a second vehicle telematics unit customized with a GD wish list with less challenging requirements, even if the two VTUs were operated by the same user performing the same driving behavior. As such, the system encourages users to promote good driving behavior by pledging themselves to a challenging GD wish list that will earn them more GD points and the associated benefits.

The details of these and other embodiments of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may take physical form in certain parts and steps, embodiments of which will be described in detail in the following description and illustrated in the accompanying drawings that form a part hereof, wherein:

FIG. 5 is a chart of some illustrative categories and their illustrative characteristics in accordance with various aspects of the disclosure.

Figure 1A:
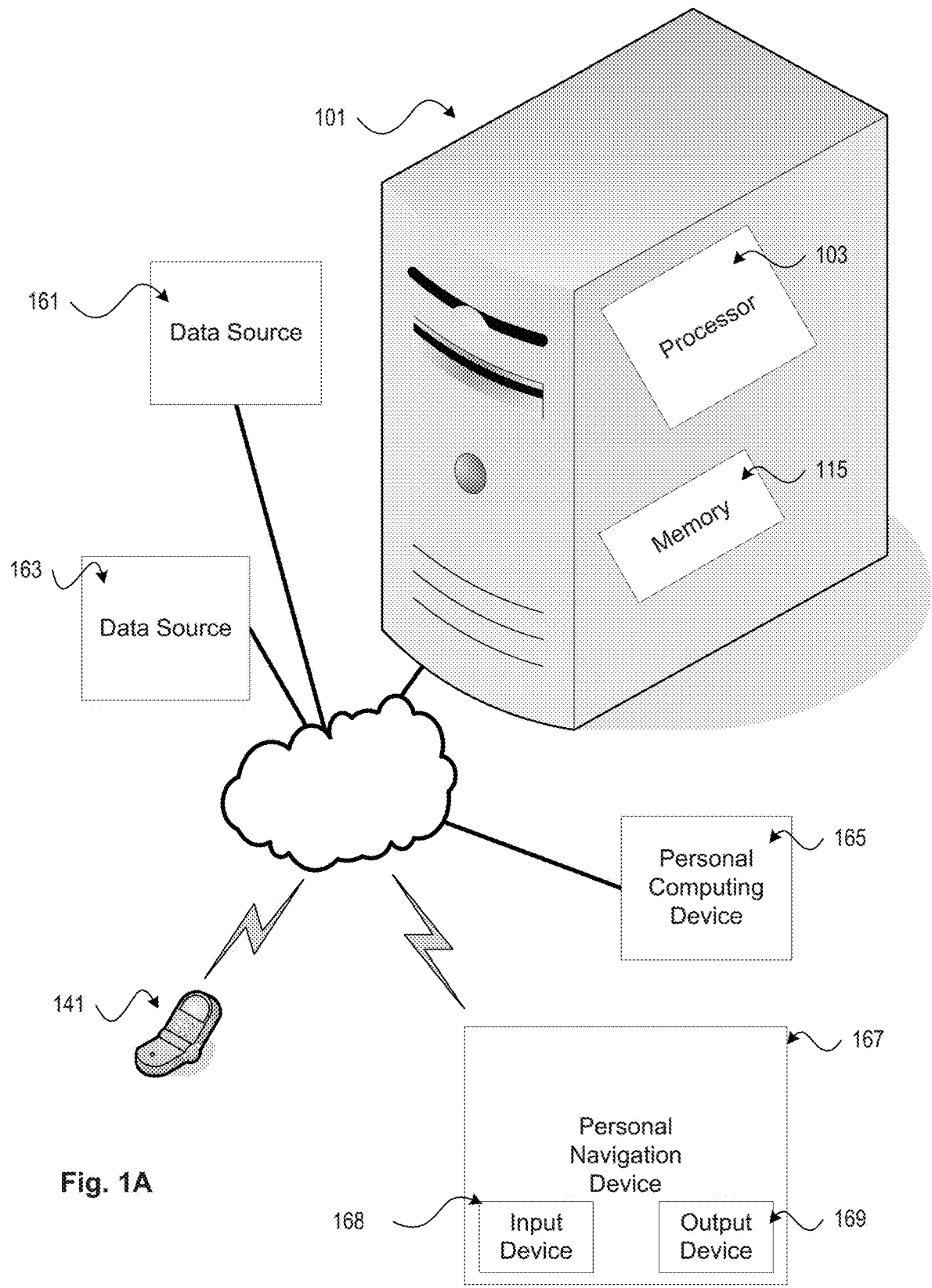
FIG. 1A and FIG. 1B depict an illustrative operating environment in accordance with various aspects of the disclosure.

It will be apparent to a person having ordinary skill in the art after review of the entirety disclosed that the steps illustrated in the figures listed above may be performed in other than the recited order, and that one or more steps illustrated in these figures may be optional. Moreover, it will be apparent to a person having ordinary skill in the art after review of the entirety disclosed that one or more components illustrated in the figures listed above may be positioned in other than the recited arrangement, and that one or more components illustrated in these figures may be optional.

DETAILED DESCRIPTION OF THE DISCLOSURE

In accordance with various aspects of the disclosure, systems and methods are disclosed to promote good driving among users. In one example, a user-customizable good driving (GD) wish list may be created, populated, modified, and/or used to promote good driving. The GD wish list may empower the user/driver to promote good driving behavior through positive reinforcement. The GD wish list may be used in conjunction with a vehicle telematics unit (VTU) to monitor, process, detect, and/or record good driving events, and communicate and/or generate positive feedback for the user. In addition to positive feedback, good driving (GD) points may be accumulated based on driving behavior. The accumulated GD points may be used in conjunction with a product and/or service offering, such as by an insurance company. In another example, the good driving wish list may be populated with one or more recommendations from a backend system that analyzes collected driving behavior data and generates customized recommendations for a particular user and/or vehicle.

Furthermore, in some examples, the system allows for a good driving (GD) wish list to include driving behavior that is external to the vehicle or driver, such as weather characteristics and/or traffic characteristics at the time of vehicle operation, and allows for the monitoring of these characteristics in a distributed computing environment. Moreover, in some examples, the system may further perform enhanced optimization of the monitoring of driver-defined combinations of characteristics that permits reduced processing load and/or sensor utilization.

In some embodiments in accordance with aspects of the disclosure, at least one benefit of some of the system components and method steps disclosed herein is the monitoring, detection, and/or recordation of good driving events (GDEs). Although in-vehicle telematics units exist to detect bad driving events (e.g., harsh braking, excessive speed, and hard steering at high speeds), they do not disclose the benefits of GDEs and other features disclosed herein. When a user/driver may already be at peak stress due to poor driving under hostile/unfriendly driving environments, these in-vehicle telematics units may heighten stress levels by bombarding the user/driver with warning alarms and audible/visible negative feedback. The disclosure, in part, teaches systems and methods that illustrate the usefulness of GDEs and the desirable effect of positive feedback and reinforcement on a user/driver. Some of the system components and method steps disclosed herein attempt to alleviate or ameliorate high stress levels by generating positive feedback for the user/driver to encourage continued good driving behavior.

In addition, in some embodiments in accordance with aspects of the disclosure, another benefit of some of the system components and method steps disclosed herein for recording GDEs is the resulting collection of quantitative data about a user's good driving behavior. Some auto insurance companies already offer discounts to customers for being accident free for a period of time, however, such insurance programs sometimes operate on a coarse granularity (e.g., was there a vehicle accident in the last twelve months) without necessarily including a quantitative analysis to actually assess whether the user's driving is safe at a finer granularity. Some of the system components and method steps disclosed herein collect quantitative data about a user's good driving behavior, and a data store of this collected data may be used to provide an enhanced insurance product that more accurately monitors and rewards good driving behavior.

Referring to FIG. 1A, an example of a suitable operating environment in which various aspects of the disclosure may be implemented is shown. The operating environment is only one example of a suitable operating environment and is not intended to suggest any limitation as to the scope of use or functionality of the disclosure. The operating environment may be comprised of one or more data sources 161, 163 in communication with a computing device 101. The computing device 101 may use information communicated from the data sources 161, 163 to generate values that may be stored in a database format. In one embodiment, the computing device 101 may be a high-end server computer with one or more processors 103 and memory 115 for storing and maintaining the values generated. The memory 115 storing and maintaining the values generated need not be physically located in the computing device 101. Rather, the memory (e.g., ROM 107, RAM 105, flash memory, hard drive memory, RAID memory, etc.) may be located in a remote data store (e.g., memory storage area 227) physically located outside the computing device 101, but in communication with the computing device 101.

A personal computing device 165 (e.g., a personal computer, tablet PC, handheld computing device, personal digital assistant, mobile device, etc.) may communicate with the computing device 101. Similarly, a personal navigation device 167 (e.g., a global positioning system (GPS), geographic information system (GIS), satellite navigation system, mobile device, other location tracking device, etc.) may communicate with the computing device 101. The communication between the computing device 101 and the other devices 165, 167 may be through wired or wireless communication networks and/or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 102 and other devices (e.g., devices 108, 110) may be connected to one or more of the networks via twisted pair wires, coaxial cable, fiber optics, radio waves or other media. The term "network" as used herein and depicted in the drawings should be broadly interpreted to include not only systems in which devices and/or data sources are coupled together via one or more communication paths, but also stand-alone devices that may be coupled, from time to time, to such systems that have storage capability.

In another embodiment in accordance with aspects of the disclosure, a personal navigation device 167 may operate in a stand-alone manner by locally storing some of the database of values stored in the memory 115 of the computing device 101. For example, a personal navigation device 167 (e.g., a GPS in an automobile) may be comprised of a processor, memory, and/or input devices 168/output devices 169 (e.g., keypad, display screen, speaker, etc.). The memory may be comprised of a non-volatile memory that stores a database of values. Therefore, the personal navigation device 167 need not communicate, in one example, with a computing device 101 located at a remote location in order to monitor whether requirements of a good driving (GD) wish list have been met. Rather, the personal navigation device 167 may behave in a stand-alone manner and use its processor to perform particular steps disclosed herein. If desired, the personal navigation device 167 may be refreshed with an updated database of values after a period of time (e.g., a regular update of GD points assignments for records in a GD wish list.)

In yet another embodiment in accordance with aspects of the disclosure, a personal computing device 165 may operate in a stand-alone manner by locally storing some of the database of values stored in the memory 116 of the computing device 102. For example, a personal computing device 165 may be comprised of a processor, memory, input device (e.g., keypad, CD-ROM drive, DVD drive, etc.), and output device (e.g., display screen, printer, speaker, etc.). The memory may be comprised of CD-ROM media that stores values used to monitor whether requirements of a good driving (GD) wish list have been met. Therefore, the personal computing device 165 may use the input device to read the contents of the CD-ROM media in order to calculate a value for the identified route. Rather, the personal computing device 108 may behave in a stand-alone manner and use its processor to perform particular steps disclosed herein. If desired, the personal computing device may be provided with an updated database of values (e.g., in the form of updated CD-ROM media) after a period of time. A person having ordinary skill in the art will appreciate that personal computing device 165, 167, 141 need not be personal to a single user; rather, they may be shared among members of a family, company, etc. taking into account various aspects of the disclosure.

The data sources 161, 163 may provide information to the computing device 101. In one embodiment in accordance with aspects of the disclosure, a data source may be a computer which contains memory storing data and is configured to provide information to the computing device 101. Some examples of providers of data sources in accordance with aspects of the disclosure include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the disclosure, access to the information in the data sources 161, 163 may be restricted to only authorized computing devices 101 and for only permissible purposes. For example, access to the data sources may be restricted to only those persons/ entities that have signed an agreement (e.g., an electronic agreement) acknowledging their responsibilities with regard to the use and security to be accorded this information.

The computing device 101 may use the information from the data sources 161, 163 to generate values that may be used to monitor whether requirements of a good driving (GD) wish list have been met. Some examples of the information that the data sources may provide to the computing device 101 include, but are not limited to, accident information, geographic information, and other types of information useful in being monitored in a GD wish list.

Figure 1B:
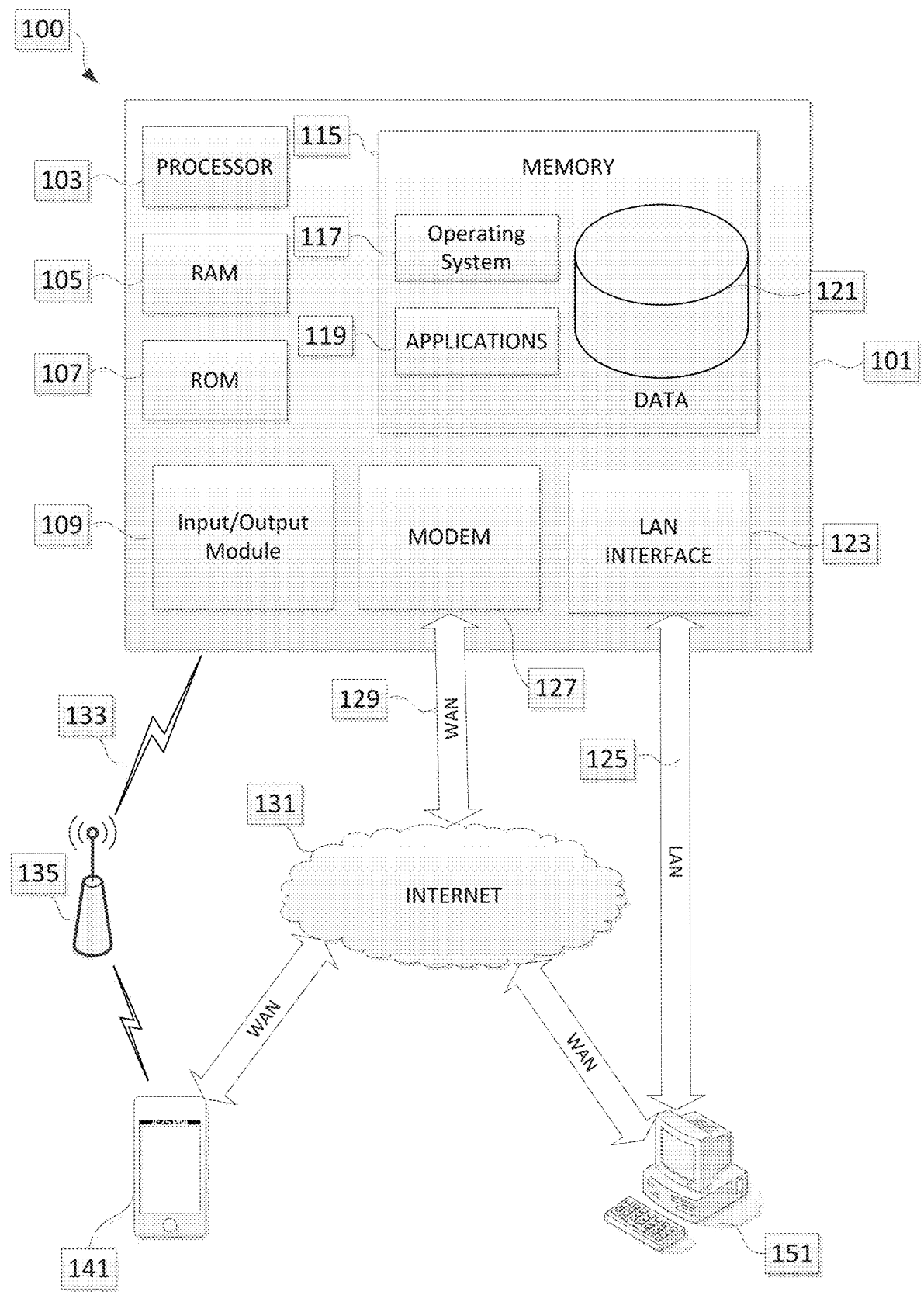

FIG. 1B illustrates a block diagram of a computing device (or system) 101 in communication system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a good driving analysis server or system 220, configured as described herein for receiving and analyzing vehicle driving data and using the analysis to assign good driving (GD) points to records in a good driving wish list.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the good driving analysis system 220 to execute a series of computer-readable instructions to receive driving data from a first vehicle 210 and other vehicles 210*a-n*.

The good driving analysis system 220 may operate in a networked environment 100 supporting connections to one or more remote computers, such as terminals 141 and 151. The terminals 141 and 151 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the driving analysis system 101. The network connections depicted in FIG. 1 include a local area network (LAN) 125 and a wide area network (WAN) 129, and a wireless telecommunications network 133, but may also include other networks. When used in a LAN networking environment, the good driving analysis system 220 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the good driving analysis server/system 220 may include computer executable instructions (e.g., driving analysis programs and driver score algorithms) for receiving vehicle driving data, retrieving additional driving data for other vehicles, analyzing and comparing the driving data with respect to specific driving behaviors, performing a driving data analysis or driver score computation for one or more vehicles or drivers, and performing other related functions as described herein.

Figure 2:
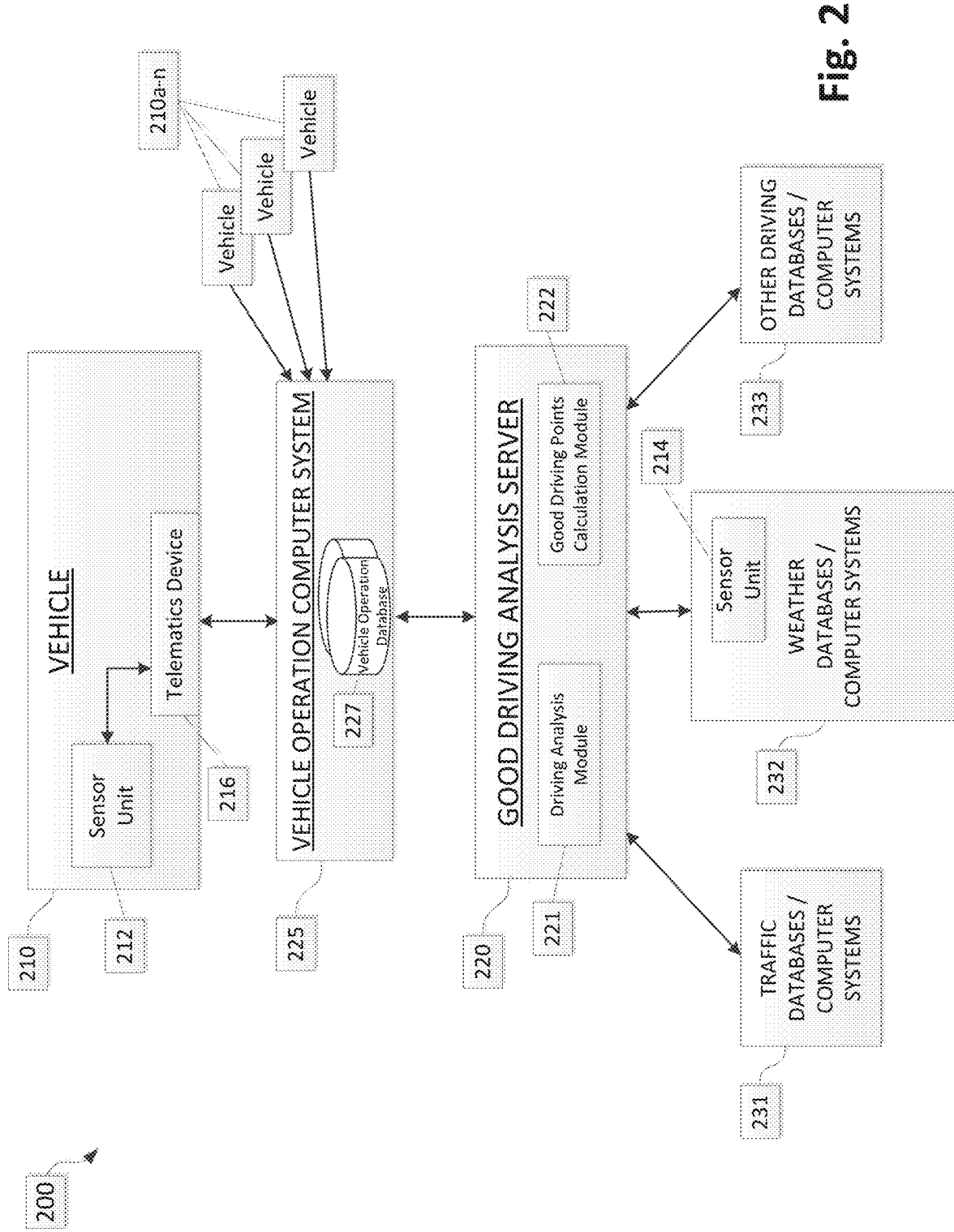
FIG. 2 depicts an illustrative vehicle in communication with one or more computer systems assisting in the promotion of good driving behavior in accordance with various aspects of the disclosure.

FIG. 2 is a diagram of an illustrative driving analysis system 200. Each component shown in FIG. 2 may be implemented in hardware, software, or a combination of the two. Additionally, each component of the driving analysis system 200 may include a computing device (or system) having some or all of the structural components described above for computing device 101.

The driving analysis system 200 shown in FIG. 2 includes a vehicle 210, such as an automobile, motorcycle, or other vehicle for which a good driving analysis may be performed. The vehicle 210 may include one or more on-board data recording systems, for example, on-board diagnostic (OD-BII) systems, telematics unit 216, and/or vehicle computer systems, which may include or may be configured to communicate with sensor units (e.g., vehicle sensors 212, such as proximity sensors, cameras, etc., and remote sensor units 214, etc.) and other on-board data detection devices. In addition, the vehicle 210 may communicate through the telematics unit 216 with sensor units 214 in remote servers 232, 231, 233.

Vehicle sensor units 212 refer to a set of sensors and data detection devices capable of detecting and recording various conditions at the vehicle and operational parameters of the vehicle. For example, sensor units 212 may detect and store data corresponding to the vehicle's speed, distances driven, rates of acceleration or braking, geographic location and/or specific instances of sudden acceleration, braking, and swerving. Sensor units 212 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensor units 212 may detect and store the external driving conditions, for example, external temperature, rain (e.g., using a rain sensor on a windshield), light levels, and sun position for driver visibility. Sensor units 212 also may detect and store data relating to moving violations and the observance of traffic signals and signs by the vehicle 210. Furthermore, internal cameras in sensor units 212 may detect conditions such as the number of the passengers in the vehicle 210, and potential sources of driver distraction within the vehicle (e.g., pets, phone usage, unsecured objects in the vehicle). External cameras and/or proximity sensors in sensor units 212 may detect other nearby vehicles, traffic levels, road conditions, traffic obstructions, animals, cyclists, pedestrians, and other conditions that may factor into a driving analysis. Additional sensors 212 may detect and store data relating to the maintenance of the vehicle 210, such as the engine status, oil level, engine coolant temperature, odometer reading, the level of fuel in the fuel tank, engine revolutions per minute (RPMs), and/or tire pressure. A person of ordinary skill in the art will recognize that a cornucopia of other sensors are disclosed and contemplated for sensor units 212 in this accordance with various aspects of this disclosure.

The vehicle 210 also may include one or more sensor units 214 remotely located from a vehicle telematics unit (VTU) 216 and capable of recording additional conditions inside or outside of the vehicle 210. For example, a sensor unit 214 may be communicatively coupled with a computer system 232 receiving weather information from a data source 161. The weather information may be used by the sensor unit 214 to determine whether the vehicle 210 is being operated in particular weather conditions (e.g., rain, snow, sleet, hail, temperature, wind, road conditions, visibility, etc.) For example, the VTU 216 may provide the location (e.g., GPS coordinates) of the vehicle to the sensor unit 214 located at the remote computer system 232. The computer system 232 with its associated database/data store of weather information may act as a sensor unit 214 in accordance with various aspects of the disclosure. The sensor unit 214 may use the location information of the vehicle to determine the weather condition (e.g., snow characteristic, hail characteristic, etc.) at the given time. In some examples, the sensor unit 214 may immediately transmit that information to the VTU 216. In other examples, the sensor unit 214 may transmit the information only if the information has changed over the last time that particular information was requested, in accordance with the different characteristics types (e.g., continuous-type characteristic) discussed herein. A person having ordinary skill in the art will appreciate after review of the entirety disclosed herein that although the preceding example discusses characteristics in the weather category, various other characteristics in other categories (e.g., location category, road rules category, etc.) may use a similar arrangement to monitor the user's driving behavior in accordance with the user's good driving wish list.

The sensor units 212 may store data within the vehicle 210, and/or may transmit the data to one or more external computer systems. As shown in FIG. 2, the sensor units 212 may be configured to transmit data to one or more external computer systems via a telematics device 216. In other examples, one or more of the sensor units 212 may be configured to transmit data directly without using a telematics device 216. For example, telematics device 216 may be configured to receive and transmit data from some sensors in the sensor units 212, while other sensors may be configured to directly transmit data to one or more external computer systems without using the telematics device 216. Thus, telematics device 216 may be optional in certain embodiments where one or more sensor units within the vehicle 210 may be configured to independently capture, store, and transmit vehicle operation and driving data.

Telematics device 216 may be a computing device containing many or all of the hardware/software components as the computing device 101 depicted in FIG. 1B. As discussed above, the telematics device 216 may receive vehicle operation and driving data from sensor units 212, 214 and may transmit the data to one or more external computer systems over a wireless transmission network. Telematics device 216 also may be configured to detect or determine additional types of data relating to real-time driving and the condition of the vehicle 210. In certain embodiments, the telematics device 216 may contain or may be integral with one or more of the sensor units 212 discussed herein.

Additionally, the telematics device 216 (using sensor units 212) may be configured to collect data regarding the number of passengers and the types of passengers (e.g. adults, children, teenagers, pets, etc.) in the vehicle 210. The telematics device 216 also may be configured to collect data about a driver's movements or the condition of a driver. For example, the telematics device 216 may include or communicate with sensors that monitor a driver's movements, such as the driver's eye position and/or head position, etc. Additionally, the telematics device 216 may collect data regarding the physical or mental state of the driver, such as fatigue or intoxication. The condition of the driver may be determined through the movements of the driver or through sensors, for example, sensors that detect the content of alcohol in the air or blood alcohol content of the driver, such as a breathalyzer with an ethanol vapor (EtOH) sensor.

The telematics device 216 (using sensor units 212) also may collect information regarding the driver's route choice, whether the driver follows a given route, and to classify the type of trip (e.g. commute, errand, new route, etc.). In certain embodiments, the telematics device 216 may be configured to communicate with the sensor units 212, 214 to determine when and how often the vehicle 210 stays in a single lane or strays into other lanes. To determine the vehicle's route, lane position, and other data, the telematics device 216 may include or may receive data from a mobile telephone, a Global Positioning System (GPS), locational sensors positioned inside a vehicle, or locational sensors or devices remote (e.g., sensor units 214) from the vehicle 210.

The telematics device 216 also may store the type of the vehicle 210, for example, the make, model, trim (or sub-model), year, and/or engine specifications. The vehicle type may be programmed into the telematics device 216 by a user or customer, determined by accessing a remote computer system, such as an insurance company or financial institution server, or may be determined from the vehicle itself (e.g., by accessing the vehicle's 210 computer systems).

Vehicle operation computer system 225 may be a computing device separate from the vehicle 210, containing some or all of the hardware/software components as the computing device 101 depicted in FIG. 1. The vehicle operation computer system 225 may be configured to receive and store the vehicle operation data discussed above from vehicle 210, and similar vehicle operation data from one or more other vehicles 210a-n. In the example shown in FIG. 2, the vehicle operation computer system 225 includes a vehicle operation database 227 that may be configured to store the vehicle operation data collected from the sensor units 212, 214 and telematics devices 216 of a plurality of vehicles. The vehicle operation database 227 may store sensor data and other data for multiple vehicles 210.

The good driving analysis server 220 and the vehicle operation computer system 225 may be implemented as a single server/system, or may be separate servers/systems. In some examples, the good driving analysis server 220 may be a central server configured to receive vehicle operation data from a plurality of remotely located vehicle operation computer systems 225.

As shown in FIG. 2, good driving analysis server 220 may include a driving analysis module 221 and a good driving (GD) point calculation module 222. Modules 221 and 222 may be implemented in hardware and/or software configured to perform a set of specific functions within the good driving analysis server 220. For example, the driving analysis module 221 and the GD point calculation module 222 may include one or more driving analysis/GD point calculation formulas/models, which may be executed by one or more software applications running on generic or specialized hardware within the good driving analysis server 220. The driving analysis module 221 may use the vehicle operation data received from the vehicle operation computer system 225 and/or other systems to perform driving analyses for specific vehicles 210 and/or users/drivers. The GD point calculation module 222 may use the results of the driving analysis performed by module 221 to calculate or adjust good driving (GD) points associated with a custom driving event (CDE) record in a user's GD wish list. Further descriptions and examples of the models, functions, and analyses that may be executed by the driving analysis module 221 and the GD point calculation module 222 are described herein.

To perform driving analyses and good driving (GD) point calculations, the good driving analysis server 220 may initiate communication with and/or retrieve data from one or more vehicles 210, vehicle operation computer systems 225, and/or additional computer systems 231, 232, 233, 161, 163 storing data that may be relevant to the driving analyses and GD point calculations. For example, one or more traffic data storage systems 231, such as traffic databases, may store data corresponding to the historical amount of traffic and certain historical traffic characteristics (e.g., amount of traffic, average driving speed, traffic speed distribution, and numbers and types of accidents, etc.) at various specific locations and times.

One or more additional driving databases/systems 233 may store additional driving data from one or more different data sources or providers which may be relevant to the driving analyses and/or GD point calculations performed by the good driving analysis server 220. Additional driving databases/systems 233 may store data regarding events such as road hazards and historical traffic accident statistics, road construction zones, school zones, and natural disasters that may affect the driving analyses and/or GD point calculations performed by the good driving analysis server 220. As discussed herein, the good driving analysis server 220 may retrieve and use data from databases/systems 231-233, 161, 163 to analyze and evaluate the driving behaviors of specific vehicles 210 and/or users/drivers.

Figure 3A:
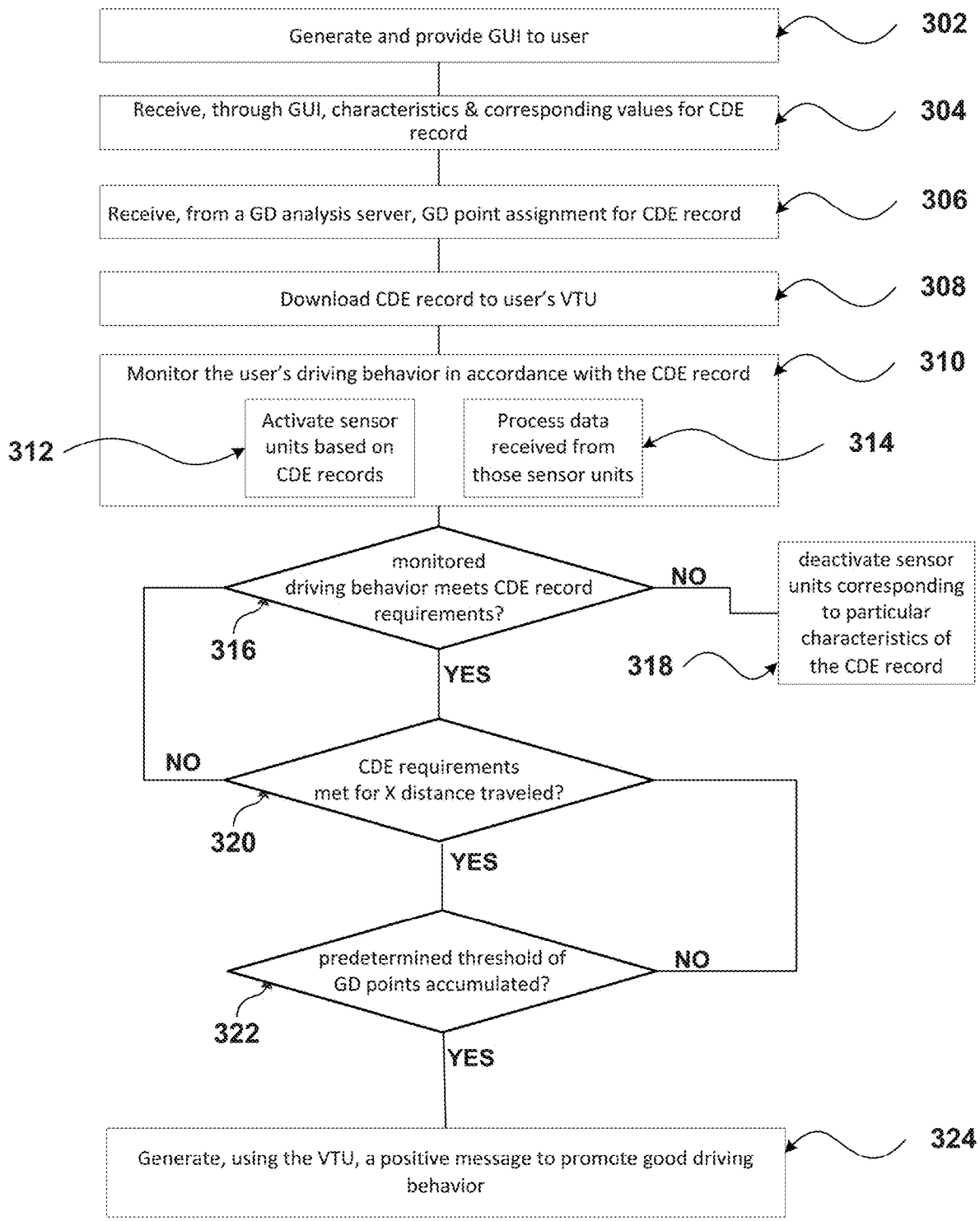
FIG. 3A, FIG. 3B, and FIG. 3C depict illustrative steps of methods of promoting good driving behavior in accordance with various aspects of the disclosure.
Figure 3B:
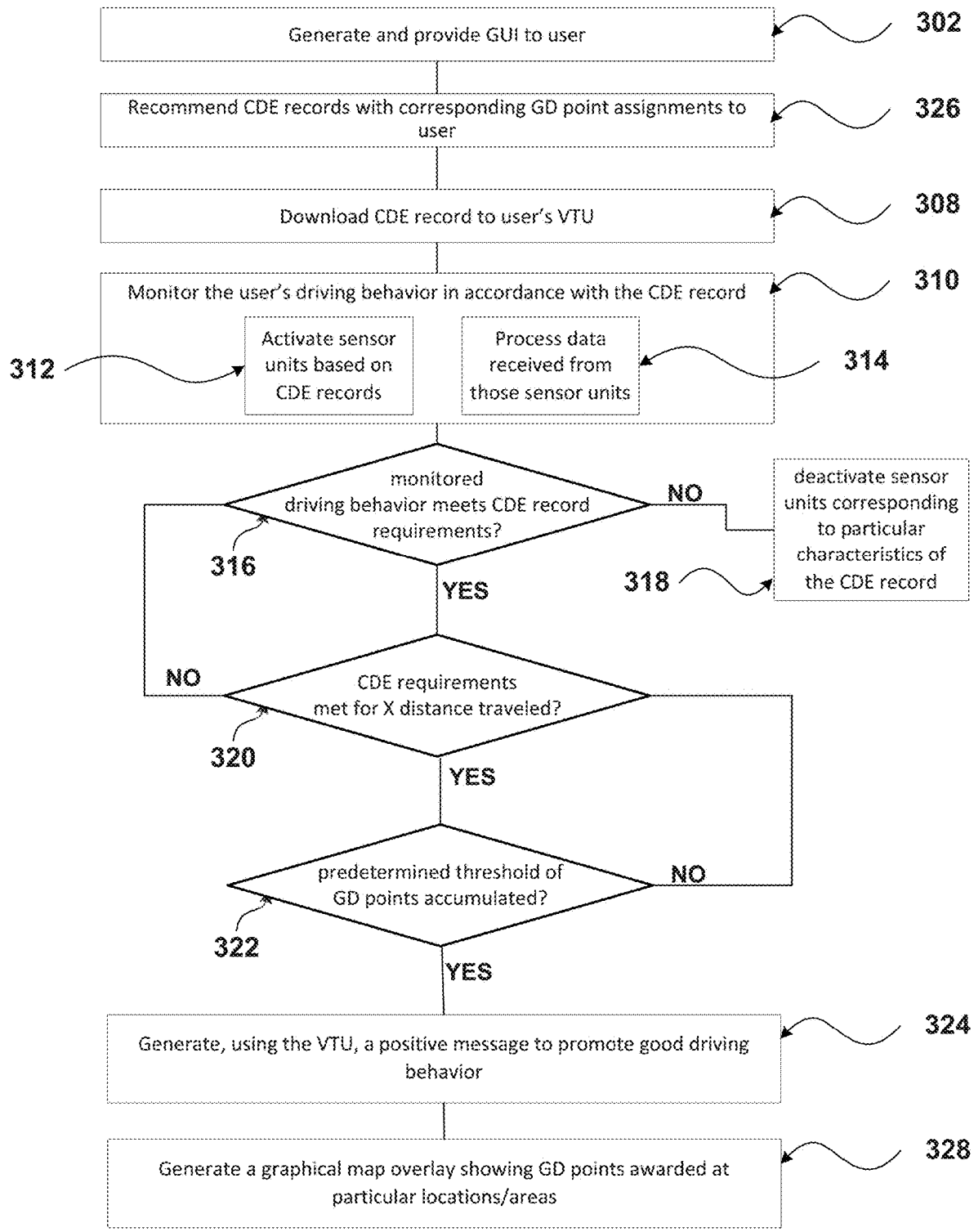
Figure 3C:
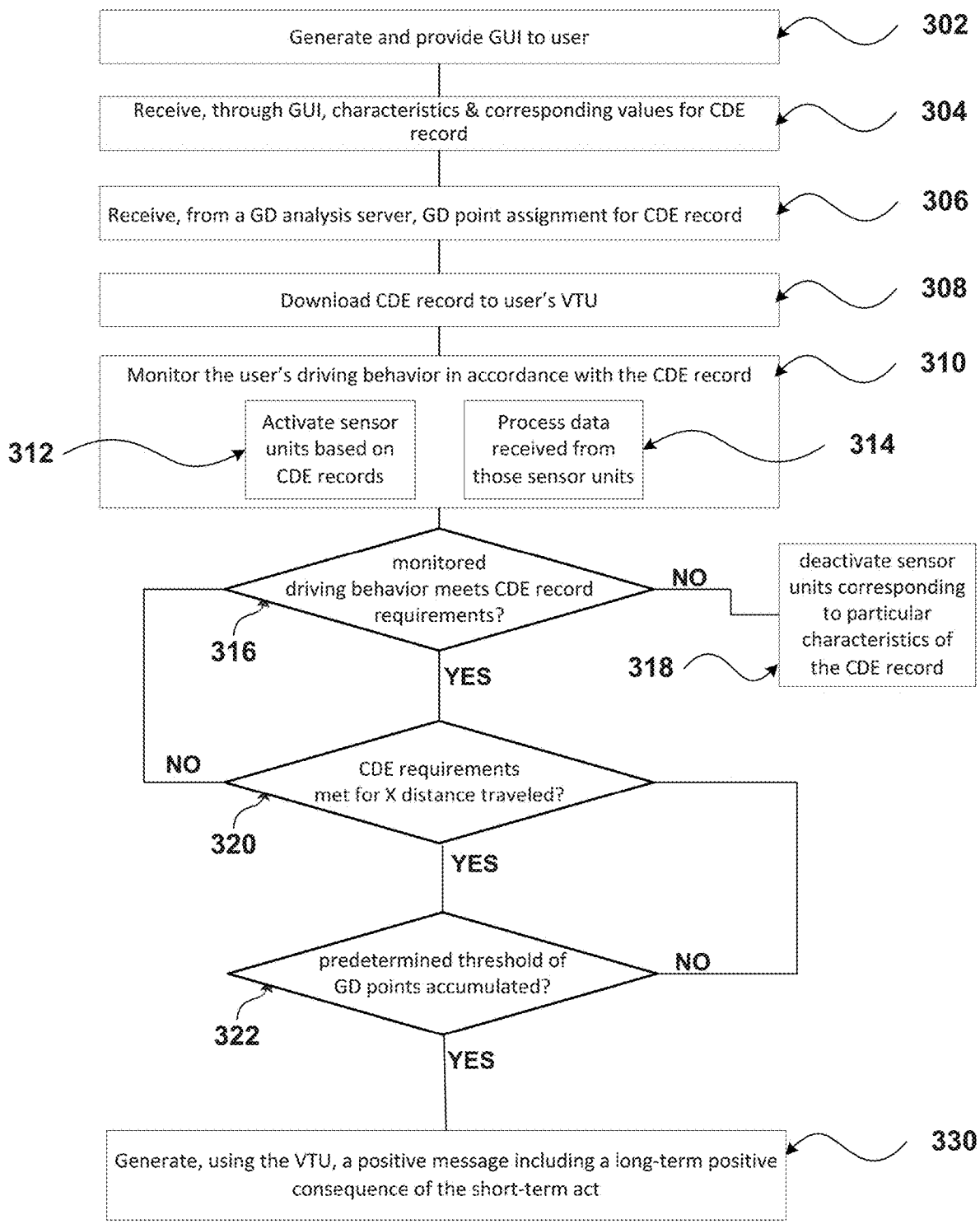

In accordance with various aspects of the disclosure, the flowcharts of FIG. 3A, FIG. 3B, and FIG. 3C refer to the one or more steps disclosed herein that may be performed by components and devices in the systems of FIG. 1A, FIG. 1B, and FIG. 2. In one embodiment, the system 200 may create, populate, modify, and/or use a good driving (GD) wish list to promote good driving behavior. The user-defined good driving wish list may comprise one or more record structures, such as a custom driving event (CDE) record. The CDE record may be stored as a record, or other data structure, in computer memory 115. The CDE record may, in some example, be in a proprietary format specific to the vehicle telematics unit (VTU 216) associated with the user/driver. In another example, the CDE record may be in a universal format such as XML, and the user-defined combination may be converted into a binary format (e.g., object code) at a later time.

The CDE record may be defined by one or more user-selected characteristics from among a plurality of characteristics (i.e., at least one user-selected combination of one or more characteristics). Numerous examples of characteristics are expressly identified herein (e.g., see FIG. 5) and further contemplated by a person having ordinary skill in the art after review of the entirety disclosed herein. At least one of the characteristics in the CDE record may be associated with the user's operation of a vehicle 210 (e.g., driving behavior). Meanwhile, other characteristics of driving behavior that may be available for use in the CDE record include characteristics related to the operational status of a vehicle, the status of the driver/user, time of day, location of the vehicle, legal regulations/rules at a particular location, the traffic at a particular location, the weather in a particular location, and/or other factors.

With so many different characteristics available for a user's selection and creation of a custom driving event (CDE) record, in one example, a graphical user interface (GUI) may be provided (see step 302) to allow the user to create and/or modify a CDE record. The GUI may be generated by computer-executable instructions stored in memory on a computing device, such as server 102. The GUI may be generated on a web browser running on a user's computing device, or may be generated by a mobile phone application stored on a user's computing device (e.g., smartphone). The GUI may provide a listing of different characteristics that may be selected by the user to create a driver-defined combination of characteristics to be added to the user's GD wish list. The characteristics may be organized/grouped into categories. Although some of the following examples describe a CDE record with characteristics (e.g., speed and braking) in the same category (e.g., "driving" category), other examples describe CDE records in which the characteristics may be part of the same and/or different categories. FIG. 5 is an illustrative table with some, but not all contemplated, characteristics and categories available for user selection and navigation.

In accordance with various aspects of the disclosure, the plurality of characteristic selections may be organized into categories. A user may select one or more characteristics and his/her selections may be combined to form a user-selected combination of characteristics. Examples of categories include, but are not limited to driving category, vehicle category, driver category, location category, time category, weather category, traffic category, road rules category, and other categories. Generally, a characteristic may be anything that can be detected and/or measured in the tangible world, sometimes with the use of sensory circuitry (e.g., sensor units 212, 214). Some examples of categories and characteristics are expressly described herein, but other examples of categories and characteristics are also contemplated herein and will become apparent to a person having ordinary skill in the art after review of the entirety disclosed herein.

Some examples of characteristics in the driving category include, but are not limited to braking characteristic, acceleration characteristic, speed characteristic, steering characteristic, lane change characteristic, lateral movement characteristic, driven miles characteristic, driving minutes characteristic, tailgate characteristic, and other characteristics. Braking characteristic, acceleration characteristic, steering characteristic, lateral movement characteristic, and other characteristics may be measured in units of force (or magnitude of force with direction omitted). In some examples, the braking characteristic and the acceleration characteristic may be conflated into a single characteristic in which a negative value indicates braking and a positive value indicates acceleration. Speed characteristics and other characteristics may be measured in units of distance over time, such as miles per hour. A "driven miles" characteristic may be measured in units of distance, such as miles. Meanwhile, a "driving minutes" characteristic may be measured in units of time, such as minutes. For example, the "driving minutes" characteristic may measure the total number of minutes a driver has operated the vehicle, from the moment the engine started until it is shutdown (e.g., the engine ignition is switched off). Lane change characteristic, tailgate characteristic, and other characteristics may be measured as Boolean values and/or numerical values. For example, a lane change characteristic may measure the riskiness of a lane change, taking into account the speed of the vehicle, the severity of the braking of the vehicle, and the severity of the steering of the vehicle. A tailgate characteristic may measure the proximity of the vehicle to the vehicle directly in front of it, taking into account the speed of the vehicle. In one example, the tailgate characteristic may be a Boolean value, set to true if a predetermined threshold is exceeded with respect to a safe following distance while the vehicle is moving above a particular speed. Generally, many of the characteristics in the driving category may be measured and/or detected with the use of conventional telematics units and/or comparable devices. For example, values for characteristics in the driving category may be retrieved through an on-board diagnostics (OBDII) interface in the vehicle. In another example values for characteristics in the driving category may be retrieved with the use of an accelerometer, gyroscope, proximity sensors, and/or digital compass in a device installed in or on the vehicle.

Some examples of characteristics in the vehicle category include, but are not limited to engine temperature characteristic, tire pressure characteristic, green characteristic, and other characteristics. An engine temperature characteristic may be measured in units of degree, such as Fahrenheit. A tire pressure characteristic may be measured in units of force per area, such as Pascal. A green characteristic may be measured as a numerical value indicating the degree to which the operation is environmentally friendly (e.g., driving within particular speed ranges may be more conducive to maximum gas mileage and earn a higher "green" rating). Generally, many of the characteristics in the vehicle category relate to the run-time, dynamic condition of the vehicle and may be measured and/or detected with the use of sensory circuitry installed in a vehicle telematics unit or vehicle, through an OBDII interface, or through an external server.

Some examples of characteristics in the driver category include, but are not limited to fatigue characteristic, intoxication characteristic, seat belt characteristic, passenger characteristic, music characteristic, cell phone usage characteristic, and other characteristics. Fatigue characteristics may be measured with the use of a sensor that measures the driver's blink rate, and may be provided as a numerical value. Intoxication characteristic may be measured using an EtOH sensor, or other device, that measures ethanol vapor or blood ethanol levels, it may be provided as a numerical value. Seat belt characteristics may be measured as a Boolean, true if the driver's seat belt is engaged and false if it is unbuckled. Passenger characteristic may be a measure of the number of passengers in the vehicle, and may be measured using infrared and/or laser technology, such as the Kinect™ system, or another technology. Music/noise characteristic may be a measure of the amount of noise in the vehicle, and may be measured in decibels using a microphone, such as one that may be provided in a smartphone or that may be installed in a vehicle. Cell phone usage characteristic may detect if particular features of a smartphone or a cellular phone are being used while the driver is operating the vehicle, and may be provided as a numerical value. For example, different uses of a smartphone may have different values associated with them, and pulling up a map on the smartphone may have a less severe effect then writing a text message on the smartphone. Generally, many of the characteristics in the driver category may be measured and or detected with the use of sensors located within the vehicle and may relate to the capacity of the driver to safely operate the vehicle.

Some examples of characteristics in the weather category include, but are not limited to rain characteristic, snow characteristic, hail characteristic, sunny characteristic, cloudy characteristic, windy characteristic, temperature characteristic, and other characteristics. Some examples of characteristics in the time category include, but are not limited to time of day characteristic, day of week characteristic, month characteristic, daylight characteristic, nighttime characteristic, or other characteristics. Some examples of characteristics in the traffic category include, but are not limited to congestion characteristic, type of vehicles characteristic, and other characteristics. Some examples of characteristics in the road rules category include, but are not limited to speed limit characteristic, stop sign characteristic, engine braking characteristic, and other characteristics. The aforementioned characteristics may be measured/determined using sensor units 214, or alternatively, in some scenarios, using sensor units 212.

Some examples of characteristics in the location category include, but are not limited to coordinate characteristic, parking lot characteristic, alley characteristic, highway characteristic, off-road characteristic, or other characteristics. Other examples of location characteristics include characteristics about construction area indicator (i.e., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of road/lanes, population density within a predetermined vicinity (e.g., within a radius, within a zip code, etc.), condition of road (e.g., new, worn, severely damaged with sink-holes, severely damaged with erosion, gravel, dirt, paved, etc.), wildlife area, state, county, and/or municipality. The aforementioned characteristics may be measured/determined using sensor units 214, or alternatively, in some scenarios, using sensor units 212.

Although numerous examples of characteristics have been described as providing numerical values, those characteristics may be provided in a different form, such as using enumerated list, without departing from the spirit of the disclosure. For example, values from 0-33 may be enumerated as "low," values between 34-66 may be enumerated as "mid," and 67-100 may be enumerated as "high." Likewise, values may be provided as green, yellow, orange, and red to indicate varying degrees of severity. In addition, numerical values may be represented as a Boolean true or false depending on whether the underlying numerical value meets a predetermined threshold value.

The numerous characteristics describe above may be selected by a user and used to define a combination of characteristics for a custom driving event (CDE) record to be added to the user's good driving (GD) wish list. The user's GD wish list may be generated at a remote server 102 using a graphical user interface (GUI) and stored at the server. A duplicate of the GD wish list may also be transmitted and stored on a vehicle telematics unit (VTU) installed in a vehicle. (See step 308.) The VTU may store the GD wish list in non-volatile memory accessible to the VTU. In one example, the GD wish list may be stored in memory in a VTU without being associated with a particular user. For example, a rental car company may offer incentives (e.g., monetary discounts, rewards, etc.) for operation of its vehicles pursuant to a GD wish list they've created, without regard for who actually is driving the vehicle. In most other examples, the GD wish list may be associated in memory with a particular user. For example, the user may be assigned a unique user identification (ID), such that if the user operates a different vehicle (e.g., a family member's car, rental car, community shared car), he/she can identify himself/herself so that the VTU may communicate with a server (e.g., a remote server, or a smartphone in the car) to download a GD wish list and configure the VTU based on that GD wish list, if the GD wish list isn't already locally stored at the VTU. A person having ordinary skill in the art, after review of the entirety disclosed herein, will appreciate that mechanism exist and are others are contemplated for allowing a user/driver to sign-in (e.g., identify themselves) to a vehicle prior to its operation.

Furthermore, the VTU may use the GD wish list to monitor, detect, and/or record good driving events and perform other functions described herein. In an alternate embodiment, the GD wish list may be generated using a graphical user interface (GUI) in communication with the VTU. This GD wish list may be stored in non-volatile memory accessible to the VTU and a copy of the GD wish list transmitted to the remote server. In such an example, the GUI may be provided by a mobile device, such as a smartphone or a personal navigation device, communicatively coupled, such as via a short-range wireless protocol like Bluetooth, to the VTU. Alternatively, the VTU may be part of the personal navigation device and the aforementioned GUI may be displayed on the touchscreen (or other human-user interface) of the personal navigation device. The GUI may also provide, in some examples, an interface through which the user/driver may sign-in to the vehicle prior to its operation.

In another example, in lieu of or in addition to a GUI, a remote server 220 may generate and recommend (see step 326) one or more custom driving event (CDE) records for a user's good driving (GD) wish list. The remote server may be part of a backend system at an auto insurance company. The remote server may analyze collected driving behavior data and other data to identify recommendations for a particular user. The remote server may use machine learning or other techniques, such as artificial intelligence, statistical/predictive modeling, or other methods, to analyze the data. In one example, the remote server may limit its analysis to just those collected driving events associated with the user/driver. In such an example, the remote server may access a database storing the collected driving behavior data of the user. This database may include good driving events (GDEs), driving events associated with poor driving behavior, and any other data associated with driving behavior and/or driver. The remote server may analyze some or all of this data to arrive at a predictive model that identifies candidates for possible custom driving event (CDE) records for the user's good driving wish list. The CDE record recommended by the remote server may identify driving behavior that, if performed, would put the user/driver in the least amount of risk while driving. In addition, the CDE record recommended by the remote server may identify driving behavior, if performed, would contribute to a lower premium on the user's auto insurance policy. As such, if the user accepts the recommended CDE record for his good driving wish list, then the user is likely to benefit from safer driving and/or reduced insurance premiums.

In another example in accordance with various aspects of the disclosure, the remote server may analyze an aggregate of collected driving behavior data for a plurality of users. The good driving analysis server 220 (e.g., using driving analysis module 221) may analyze all users' collected driving behavior data and other information and identify especially risky driving behavior. A remote server (e.g., server 220) may generate a CDE record based on the analysis and present it as a recommendation to users constructing a good driving (GD) wish list. At least one benefit of such an approach is that the user benefits from not only his own driving experience, but also that of other users. In one example, the subset of all users used for the analysis may be just those users with similar objectives, profile, or other aspects as the subject user (e.g., all users in a zip code, all users in Illinois, all users with a particular driving history, etc.) In some embodiments, the user may be provided the option of adding the recommended CDE record to his good driving wish list. Alternatively, in other embodiments, the recommended CDE record may automatically be added to the good driving wish list. For example, in the case where the driver is a teenager and the parent wishes to supervise the contents of the good driving wish list, the user may be required to include (e.g., the teenager cannot remove once added) particular CDE records in the teenager's good driving wish list.

In some embodiments, a graphical user interface (GUI) provided to the user (by the system 200) may also include predefined combinations of characteristics for the user's consideration. The predefined combinations of characteristics may include statistically common characteristics that other drivers frequently use to define their own combinations. The predefined combinations of characteristics may also include those characteristics that the provider of the vehicle telematics system may recommend for the user, such recommendations may be generated over time by the provider based on data collected by the vehicle telematics system of the driver. For example, the system may determine based on collected driving data of the user that a user/driver regularly drives through a particular hairpin turn at an unsafe speed (perhaps on his way to work each morning), and may recommend a CDE record to the user with a location characteristic, speed characteristics, and braking characteristic for the location of the hairpin turn with commensurate safe driving speed/braking.

In addition, in some embodiments, the user's recommendations may also be shared with other users with similar driving behavior, based on an analysis performed by the system 200, as described herein. An alert or message may be sent to other users to indicate that the system 200 has identified recommended CDE records for their consideration, and then present those recommendations when they next log in to the system (either via the VTU or some other interface). A person having ordinary skill in the art will appreciate after review of the entirety disclosed herein that numerous techniques may be used to analyze and predict the similarity between users (e.g., users that drive similar road segments in similar ways during similar hours of the week-day).

In accordance with various aspects of the disclosure, each custom driving event (CDE) record in the good driving (GD) wish list may be associated with a value, such as a good driving (GD) point value (i.e., an amount of GD points corresponding to the at least one-user selected combination). The point value associated with the CDE record may be a numeric value, a currency amount, or in some other form, such as virtual credit towards an online game, frequent flier miles for a particular airline, or some other benefit (e.g., conversion of GD points to free hotel stays or other benefits). The GD point value may be based on the difficulty of complying with a particular good driving behavior. The difficulty may be based in part on user-provided values, which are indicative of good driving behavior that the user wishes to maintain, corresponding to the one or more characteristics in the at least one CDE record in the GD wish list. For example, a first CDE record that requires a user to drive less than 30 miles per hour on a street adjacent to an elementary school during times when school is in-session may be more difficult than a second CDE record that requires a user only to drive less than 50 miles per hour on that same street segment. As such, the first CDE record may have a greater GD point value associated with it than the second CDE record. In another example, a first CDE record may require a user to simultaneously drive less than 30 miles per hour while also avoiding any extreme braking (e.g., avoiding braking which results in greater than 0.6 g force being measured by the vehicle telematics unit along any axis), while a second CDE record may only require a user to drive less than thirty miles per hour. In such an example, the first CDE record may have a far greater GD point value associated with it than the second CDE record. Consequently, a user with a GD wish list comprising relatively more challenging CDE records may more quickly accumulate GD points for his good driving behavior than another user with a less challenging GD wish list. In some examples, the user-provided value may be a numerical value, a Boolean value, string, or other value for comparison with characteristics indicative of a user's driving behavior.

A user may interact with a graphical user interface (GUI) to select one or more characteristic and then define what criteria the characteristics must meet for the custom driving event (CDE). (See step 304.) In the prior example, the CDE record identified when a user simultaneously drives less than 30 miles per hour while also avoiding any extreme braking (e.g., avoiding braking which results in greater than 0.6 g force being measured by the vehicle telematics unit along any axis). In other words, so long as the driver's braking isn't measuring above 0.6 g force when the car is operating over 30 mph, he is driving within the parameters of his custom good driving (GD) wish list and a custom driving event (CDE) is triggered. In one embodiment in accordance with various aspects of the disclosure, a CDE is triggered after the CDE record has been satisfied for a predetermined interval. For example, after the user has driven a vehicle 0.25 miles (or some other predetermined amount of distance) while complying with the CDE record's parameters, a CDE may be triggered to credit the user with the appropriate amount of good driving (GD) points. In another example, after the user has driven a vehicle for 30 seconds (or some other predetermined amount of time) while complying with the CDE record's parameters, a CDE may be triggered to credit the user with the appropriate amount of good driving (GD) points. A person having ordinary skill in the art after review of the entirety disclosed herein will appreciate that particular hardware or software (e.g., a timer or counter) may be used at the vehicle telematics unit (VTU) to maintain a count of the amount of distance and/or time a vehicle has traveled while a CDE record's parameters have been met.

A remote server may assign (see step 306) good driving (GD) point values to CDE records. The GD point value associated with a CDE record may be calculated based on one or a combination of multiple, predetermined values. In one example, an initial default number of GD points (e.g., two initial GD points) may be automatically allotted to any CDE record containing a braking characteristic that is added to a user's good driving (GD) wish list to promote good driving behavior. The remote server may modify the initial GD points assigned to the CDE record based on the magnitude of force designated for the braking characteristic of the CDE record. The remote server may use machine learning or other techniques, such as artificial intelligence, statistical/predictive modeling, or other methods, to analyze the data and determine how many GD points to assign to the particular CDE record with user-provided values. In one example, a CDE record designating 0.3 g as the force within which a user must brake to meet the requirements of the good driving wish list may have a GD point value of 0.25 added to the initial GD points. Meanwhile, a similar GD record that designates 0.2 g as the force may have 0.5 GD points added to the initial GD points. In a similar vein, different force designations will result in a different number of GD points being assigned to the CDE record, as depicted in FIG. 4A as an exemplary line segment 402.

Figure 4A:
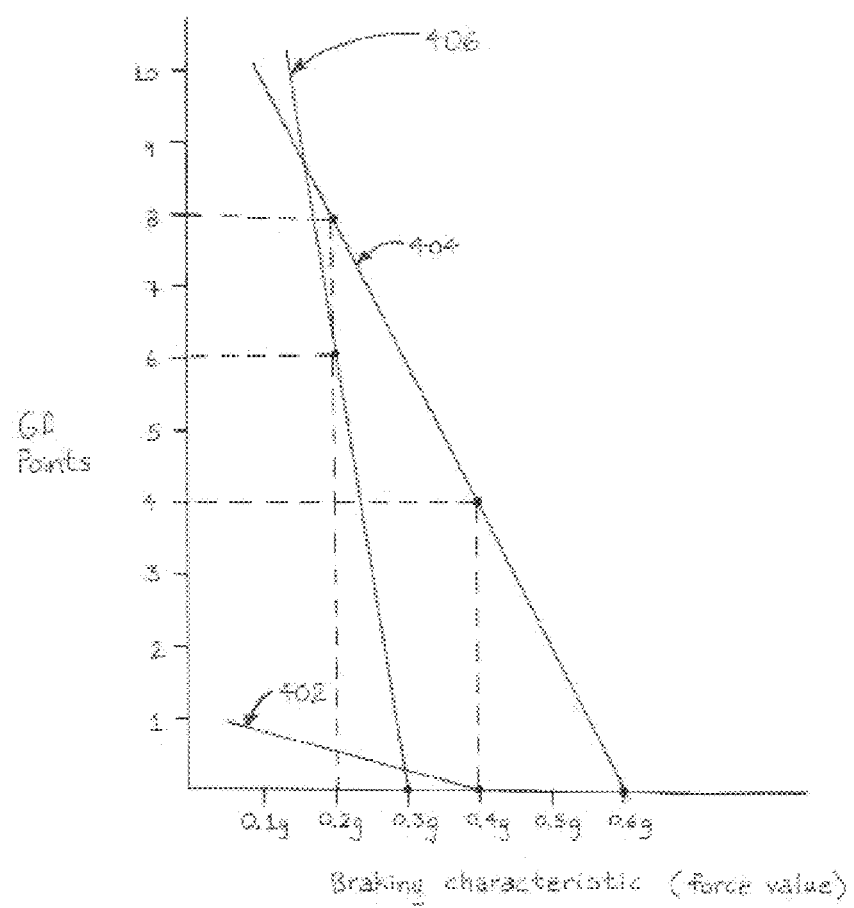
FIG. 4A and FIG. 4B illustrate examples of possible good driving point assignments with respect to particular characteristics in accordance with various aspects of the disclosure.

In some embodiments, the relationship between the GD points and the force designations may be linear as depicted in FIG. 4A, which shows a graph with GD points along one axis and force designations on the other axis. Referring to FIG. 4A, for a similar force designation of 0.2 g in the CDE record, the allotted GD points may be notably higher if the CDE record also contains a speed characteristic. For example, line segments 404 and 406 depict hypothetical relationships between GD points and braking force designations when a speed characteristic is added to the CDE record. Line segment 404 corresponds to a lower speed value designation (e.g., thirty mph) for the speed characteristic of the CDE record than similar line segment 406, which corresponds to a different CDE record with a higher speed value designation (e.g., fifty mph). As a result, a user/driver adding a CDE record to his good driving (GD) wish list corresponding to line segment 406 and a designated braking force of 0.2 g may have an additional six GD points added to the initial GD points. Thus, the user can earn as much as seven GD points for complying with the CDE record corresponding to line segment 406. In comparison, as depicted by line segment 404, the same user may earn eight GD points in addition to the one initial GD point if the user provided a lower speed value for the speed characteristic of the CDE record in his GD wish list. In other words, a user adding a CDE record corresponding to line segment 404 is indicating that his GD wish list includes being able to travel at up to thirty mph and still be able to apply the brakes such that no more than 0.2 g of force is detected by the vehicle telematics unit (VTU). For each mile that this user drives while meeting these requirements of his CDE record, the user is awarded nine GD points. Meanwhile, if the same user was less ambitious about his good driving wish list and designated fifty mph as the speed characteristic of the same CDE record, he would earn only seven GD points (i.e., one initial GD point plus six additional GD points) for the same driven mile, as depicted by line segment 406 in FIG. 4A. In at least one example, the reason for the difference in total awarded GD points may be based on a conclusion that driving at slower speeds while avoiding hard braking promotes safer driving than driving at a higher speed while avoiding the same hard braking requirements. As such, greater GD points are awarded for one activity versus the other.

A person having ordinary skill in the art after review of the entirety disclosed herein will appreciate that the data displayed in FIG. 4A is merely provided for illustrative purposes and that the actual relationship between awarded GD points, braking force characteristic, and speed characteristic may be different. The actual relationship between a CDE record and awarded GD points may be identified and derived from a modeling of collected driving behavior data as it relates to promoting good driving behavior. For example, actuarial and/or statistical modeling techniques involving multiple predictors, such as generalized linear models and non-linear models, may be applied to calculate a GD point value for a CDE record containing particular characteristics. The GD point value may be recorded in computer memory and associated with the CDE record. The multiple predictors involved in the statistical model used to calculate the GD point value may be limited to just those characteristics expressly recited in the CDE record, or may include other characteristics or factors desirable for a more accurate GD point value assignment for the CDE record.

Moreover, a person having ordinary skill in the art after review of the entirety disclosed herein will appreciate that although the relationship between GD points, braking force characteristic, and speed characteristic is depicted in FIG. 4A as linear (i.e., a straight line with a constant slope), in other examples, the relationship may be exponential or of some other form (e.g. logarithmic, a result of a formula or model, etc.) In some embodiments, the GD point value assignment for a particular CDE record may be permanent once assigned. In other embodiments, the GD point value assignment for a particular CDE record may be dynamically changing. For example, a company (e.g., insurance company) may collect driving behavior data from its users and other data from external sources (e.g., accident reports, crime reports, etc.) and update its models and analysis on a periodic basis (e.g., weekly, monthly, annually, bi-annually, etc.) Then, it may update GD point value assignments for existing CDE records based on this analysis and conclusions about which particular characteristics, or combination of characteristics, of CDE records promote good driving behavior. Consequently, the relationships depicted in FIG. 4A and FIG. 4B may change over time with updated models and analysis.

Figure 4B:
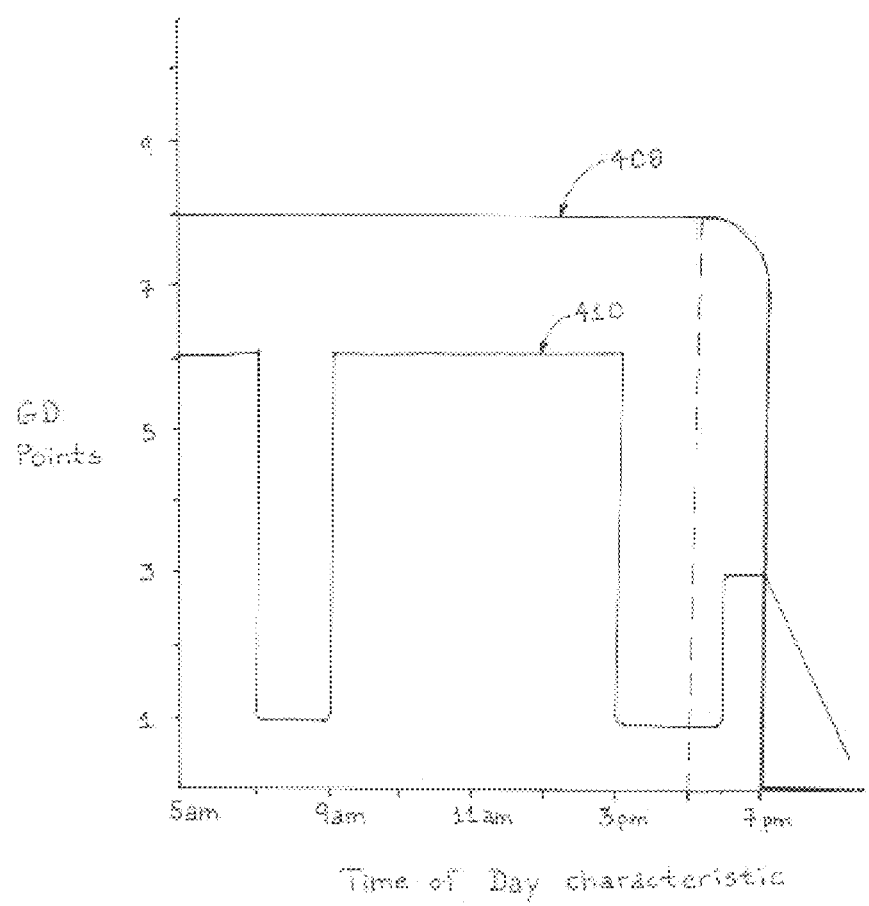

In some examples, the number of GD points assigned to a CDE record may be based on a model that analyzes the aggregate collected driving behavior data of all users, including driving data that is collected from other sources, e.g., accident report databases, crime report databases, etc. Although the analyzed data is not specific to just the user, the aggregate analysis may provide insight into which CDE records contribute to the most improvement in safe/good driving behavior. For example, FIG. 4B illustrates a graph with GD points along one axis and a characteristic belonging to the time category (e.g., "time of day" characteristic) on the other axis. Referring to FIG. 4B, the aggregate GD points collected throughout the day from vehicles located within the city limits of hypothetical "Danger Mountain" may be analyzed to determine that, as illustrated by graph 408, after 5 pm the likelihood of good driving behavior begins to decline until about 7 pm, when almost no driving behavior is likely good. Hypothetical Danger Mountain may be located on a steep cliff-side with no street lights, such that once the sun begins to set around 5 pm, the riskiness of driving exponentially increases until about 7 pm, when the sun at hypothetical Danger Mountain has set. As a result of the server's analysis, an insurance company may use graph 408 to assign GD points to a CDE record containing both a "time of day" characteristic and a characteristic in the location category identifying Danger Mountain (e.g., a "zip code" characteristic that is assigned the zip code for Danger Mountain). For example, a CDE record in a user's GD wish list that designates a "time of day" value of 8 pm (i.e., the user pledges to only drive at 8 pm or earlier) and a "zip code" characteristic corresponding to that of Danger Mountain would be assigned zero GD points. In other words, the user would not receive any GD points for driving at 8 pm (or anytime earlier) in Danger Mountain. In other words, the user's aforementioned CDE record is not challenging because it allows the user to drive at 8 pm, thus the CDE record is awarded no GD points, in this one example. Meanwhile, if the CDE record in the user's GD wish list designates a "time of day" value range of 5 am to 3 pm and a "zip code" characteristic corresponding to that of Danger Mountain, then it would be assigned eight GD points, as illustrated in graph 408. In other words, the amount of GD points is greater for daytime driving than nighttime driving. Graph 408 may be generated, in one example, based on the analysis of aggregate collected driving behavior data of all users driving in Danger Mountain, including driving data that is collected from other sources, e.g., accident report databases, crime report databases, etc.

Similarly, graph 410 in FIG. 4B illustrates the GD points awarded to a user for driving during certain times of the day in zip code 60606, which corresponds to a heavily-congested metropolitan area in the downtown area of a city. Hypothetical graph 410 illustrates that the relationship between awarded GD points and characteristics of a CDE record in a user's GD wish list may be based on a formula. Here, in contrast to graph 408 or the graphs in FIG. 4A, the slope and value of GD points is highly volatile and is driven by a model developed through an analysis of good driving behavior patterns during rush hour traffic and other times of the day in the particular zip code. The graph 410 illustrates that a user with a commensurate CDE record in his GD wish list will be awarded only one GD point for driving in zip code 60606 during the two rush hour time periods, but cam as much as six GD points for driving in the same zip code during non-rush hours periods. As a result, a user that regularly commutes through streets located in zip code 60606 might create a CDE record in his GD wish list indicating that he'd like to promote good driving behavior by driving between 5 am-7 am in zip code 60606 (and earn GD points for following through with that pledge). Based on graph 410, that CDE record may be assigned six GD points. Once added to his GD wish list, whenever the user drives in zip code 60606 during the time period of 5 am-7 am, he will accumulate at least six GD points. Meanwhile, whenever the user drives in zip code 60606 at times outside of the designated time interval in the CDE record in his GD wish list, the user might not earn any GD points.

In another example, if the user from the preceding example selects a less challenging GD wish list by designating a time period of 5 am-6 pm (i.e., the entire business day) for the aforementioned CDE record, the number of GD points assigned to the CDE record may be far less. In one embodiment, the number of GD points may be based on the lowest GD point value in graph 410 during the entire time period (i.e., one GD point). In an alternate embodiment, the number of GD points may be based on the calculated average GD point value in graph 410 over the entire time period (e.g., making use of the integral function of calculus). In yet another alternate embodiment, the number of GD points may be based on some other mathematical function using graph 410 (e.g., max, average, mean, medium, standard deviation, etc.) A person having ordinary skill in the art after review of the entirety disclosed herein will appreciate that the user/driver's success and, more significantly, rate of success/advancement in the "good driving" program disclosed herein is in the user's own hands. Based on the aggressiveness of the user's custom good driving wish list, the user will earn more GD points over a shorter time period commensurate with the promotion of good driving behavior, as illustrated in FIG. 4A and FIG. 4B, among others. For example, a user that adds more stringent, difficult/challenging CDE records to his user-defined good driving wish list may earn more GD points over the same time period for the same driving behavior than if the same user had added less stringent CDE records to his GD wish list. This highlights that the impetus is on the user to challenge himself/herself to strive to pledge a more challenging good driving wish list and meet those good driving challenges, thus earn more GD points for the same driving behavior.

In one embodiment in accordance with aspects of the disclosure, a data source 104 may provide the server 220 with accident information that is used to generate GD point value assignments (e.g., create new values and/or update existing values) for custom driving event (CDE) records. The server 220 may use at least part of the received accident information to calculate a GD point value, associate the value with particular characteristics or combination of characteristics and their values/value ranges, and store that information in a data store (e.g., database). A person having ordinary skill in the art will appreciate, after review of the entirety disclosed herein, that there may be other types of information that may be useful in generating GD point values assignments. For example, in accordance with aspects of the disclosure, a data source 161 may provide a driving analysis server 220 (e.g., computing device 101) with location characteristics for use in generating GD point values. For example, a computing device 101 may receive location characteristics corresponding to a road segment with frequent vehicular incidents and then calculate GD points accordingly. Therefore, when calculating GD point values, the system may use, in one example, the location characteristics, accident information, and/or other information.

A vehicle telematics unit (VTU) may be configured, in accordance with various aspects of the disclosure, to be customized by a user-defined good driving (GD) wish list. The VTU may include a controller (e.g., micro-controller, programmable control logic (PLC), application-specific integrated circuit (ASIC), or comparable components) installed in a user's vehicle and monitor the user's driving behavior. In one example, the VTU may comprise at least one sensor unit to monitor (see step 310) characteristics of the user's driving behavior. In another example, the vehicle may comprise at least one sensor unit to monitor the characteristics of the user's driving behavior and communicate it to the VTU for storage, processing, and/or transmission. A person having ordinary skill in the art will appreciate after review of the entirety disclosed herein that conventional vehicles with onboard diagnostics (OBD) ports and associated sensors are well known and may be used in conjunction with one or more aspects of the disclosure.

In accordance with various aspects of the disclosure, a vehicle telematics unit (VTU) may detect if the monitored driving behavior meets the requirements corresponding to the GD wish list. For example, the GD wish list may include at least one CDE record comprising a user-selected combination of one or more characteristics. The GD wish list may also include user-provided values corresponding to these characteristics. The VTU may be configured to monitor and process (see step 314) the user's driving behavior corresponding to the user-selected combination of characteristics. If the sensor unit in the VTU and/or vehicle measures a value within the parameters designated in a CDE record in the GD wish list, then the system may award the appropriate number of good driving (GD) points, or alternatively, the system may tally the amount of distance, time, or other factor during which compliance of the CDE record has been met until a threshold amount has been reached. (See step 320.)

In one example, the VTU detects whether the parameter(s) of the CDE record have been met by taking measurements from those sensor units corresponding to the characteristics identified in the user-selected combination in the CDE record. (See step 316.) For example, an illustrative CDE record in a user's GD wish list may require a user to drive less than 30 miles per hour on a particular street adjacent to an elementary school during times when school is typically in-session. A VTU customized with this CDE record may use a speed sensor, GPS unit, and timer/clock to monitor the user's driving behavior to detect whether it meets the requirements corresponding to the user-provided values (e.g., 30 mph, GPS coordinates corresponding to a segment of the particular street, and 7 am to 4 pm from Monday through Friday during non-holidays) in the CDE record. In this example, the VTU may monitor the user's driving behavior with respect to the speed sensor, GPS unit, and timer/clock at a predetermined time interval (e.g., once every second). As such, at each time interval the VTU may detect whether the CDE record has been satisfied. In one example, assume the VTU detects in real-time that the CDE record has been satisfied at consecutive one-second time intervals starting at times t1, t2, t3, and t4. The VTU may calculate the amount of distance the user's vehicle traveled between time t1 and t2 and add this distance to a counter (i.e., a counter variable that tallies the amount of distance a vehicle traveled while complying with all the requirements of the CDE record). In one example, the counter may be a variable (or object instance) created in the VTU's memory that is incremented with each incremental distance traveled by the vehicle while complying with a CDE record. Alternatively, in some embodiments the VTU may add the amount of time the user's vehicle has been traveling between time t1 and t2 (i.e., one second) and add this time amount to a counter (i.e., a counter variable that tallies the amount of time the vehicle has been traveling while complying with all the requirements of the CDE record).

A person having ordinary skill in the art after review of the entirety disclosed herein will appreciate that a VTU may comprise a plurality of counters (e.g., counter variables) for a GD wish list. In one example, a separate counter may be created for each CDE record in the GD wish list. As such, each counter may independently increment the amount of time or distance traveled while complying with each user-selected combination of one or more characteristics represented by a CDE record. In one example, an array type variable may be used to represent the plurality of counters corresponding to a GD wish list. For those counters that count the amount of distance a vehicle has traveled, in one example, an odometer (or comparable sensor) in communication with the VTU may provide the delta distance traveled between two particular times (e.g., time t1 and time t2). In an alternative embodiment, calculus or other mathematics may be performed using the time duration and measured values of speed/acceleration/braking as inputs to calculate the delta distance between time t1 and t2. In yet another alternative, a GPS unit (or comparable sensor) may be used to calculate the delta distance between time t1 and t2.

Once the delta distance between time t1 and t2 is used to increment the corresponding counter for the CDE record, the counter may again be incremented in real-time for the delta distance between time t2 and t3, and yet again for the delta distance between time t3 and t4. Meanwhile, the VTU may also compare the value of the updated counter against a predetermined threshold value. After the predetermined threshold value is reached, the VTU may reset the counter and credit the user's account with the amount of good driving (GD) points corresponding to successful compliance with the CDE record. For example, for complying with the aforementioned CDE record (i.e., the CDE record requiring a user to drive less than 30 miles per hour on a particular street adjacent to an elementary school during times when school is typically in-session), the VTU may award six GD points to the user. The VTU may also reset the counter so that the VTU may again tally the user's compliance with the particular CDE record.

Continuing with the previous example, the user's account may be a good driving (GD) points account associated with the user. The account may be managed and maintained by an insurance provider or some other entity/individual. For example, the VTU may identify the total number of GD points earned during a trip and send them to a memory (e.g., remote data store or database corresponding to user's account) for recordation. The user may be able to view his/her total GD points by accessing a web server communicatively coupled to the aforementioned memory, or alternatively, through an in-car display (e.g., on a personal navigation device 110 or smartphone 141).

Various programs may be offered to the user based on the GD points account. For example, in the auto insurance industry, an insurance company may offer to redeem the GD points for a monetary discount towards a user's current or future auto insurance policy. In another example, once a user accumulates (see step 322) a predetermined amount of GD points, an in-car VTU may generate (see step 324) a positive message configured for perception in the user's vehicle. The positive message may be used to further promote good driving behavior and may congratulate the user for achieving each of a milestone in GD points earned (e.g., the message may state, "Congratulations on achieving 100 GD points. You have earned a virtual bronze medal! Your friends and family have been notified in an online posting on the social network of your choice"). Numerous other examples of programs to promote good driving behavior are discussed herein and below.

In addition, in accordance with various aspects of the disclosure, when taking measurements from sensor units, the VTU may be configured, in some embodiments, to optimize the usage of sensor units. For example, a VTU customized with an illustrative GD wish list with CDE records that only contain speed characteristics and braking characteristics may conserve resources (e.g., battery power, processor usage, storage, etc.) by monitoring only speed and braking values. In other words, for those characteristics included in the CDE records in the user's GD wish list, the VTU may identify and activate (see step 312) the appropriate sensor units (e.g., not de-activate necessary sensor units) to monitor the user's driving behavior. As such, the VTU may power off (e.g., deactivate in step 318), for example, a water sensor unit on a vehicle or VTU because rain indications (e.g., a "rain" characteristics) might not be necessary to detect compliance with the user's GD wish list. Alternatively, in lieu of completely powering off the water sensor unit, the VTU may reduce the frequency with which measurements are taken (e.g., from once every ten seconds to once a minute). In both examples, the disclosed VTU may result in enhanced conservation of limited resources compared to some conventional systems. Such conservation is especially beneficial as the number of sensor units and the complexity of the combination of monitored characteristics of user driving behavior increases.

The preceding example highlights a further benefit of the various features disclosed herein. In addition to being able to power down, in some examples, those sensor units that do not correspond to characteristic in CDE records of the user's GD wish list, the disclosure also contemplates that one or more characteristics identified in a CDE record may be disregarded by the VTU in some circumstances. Using Boolean logic and mathematics, the VTU may gain further efficiencies by identifying those characteristics that are futile in changing the final outcome of detecting whether all the requirements of a CDE record have been met. For example, assume a user's GD wish list comprises a single CDE record that requires both a "time of day" characteristics and a "zip code" characteristic (i.e., a first and second characteristic) to have particular values in order to earn the corresponding GD points. As will be explained below, the "zip code" characteristics is a continuous-type characteristic. As such, the disclosed system may first determine that the "zip code" characteristic does not meet the requirements of the CDE record and then can disregard monitoring of the "time of day" characteristic. Given that the characteristics are combined with a logical AND, doing so achieves greater efficiency and reduced loads for the system while still meeting the requirements of detecting whether the requirements of the CDE record has been met. A person having ordinary skill in the art will appreciate that although the preceding example refers to a CDE record with numerous characteristics combined by a logical AND (i.e., Boolean AND), in other example other logical operators (e.g., OR, NOT, XOR, etc.) may be used to combine numerous characteristics of a CDE record. As such, the VTU might or might not disregard the other characteristics in a CDE record based on these logical operators.

Moreover, in some embodiments in accordance with various aspects of the disclosure, the VTU system may benefit from additional operating efficiency based on the type of each characteristic in a CDE record. As depicted in FIG. 5, in addition to being organized into categories, the characteristics may also be classified into at least two general types: instantaneous and continuous. Instantaneous-type characteristics are those for which a VTU requests the appropriate sensor unit to provide a measured value at the time (e.g., instance) when the VTU is ready to detect whether the requirements of a CDE record in the user's GD wish list have been met. Continuous-type characteristics are those for which a VTU may rely, in some circumstances, upon the previous measured value provided by the appropriate sensor unit. For example, FIG. 5 indicates that a "day of week" characteristic in a CDE record may be of a continuous-type. In one example, the "day of week" characteristic may be measured once by the VTU upon the start of a vehicle's trip. The measured value may be stored in a variable in the memory (e.g., volatile memory) of the VTU corresponding to the particular characteristic, and the VTU may use that value for future processing/detecting. At least one benefit of such an arrangement is reduced latency over that of instantaneous-type characteristics.

In addition, continuing with the preceding example, the VTU may register with the appropriate sensor unit providing the "day of week" measurement to be notified if the value of the measurement changes at any time before the VTU de-registers with the sensor unit (e.g., at the end of the vehicle's trip.) In addition to notifying the VTU, the sensor unit may also provide the updated measurement of the characteristic. In the aforementioned example, the VTU may benefit from reduced load because the sensor unit is not repeatedly providing the same "day of week" values to the VTU. In an alternate embodiment, the VTU may measure the "day of week" characteristic at the start of the trip, but be configured to take the next measurement of the characteristic at the appropriate interval (e.g., thirty minutes, an hour, six hours, twelve hours, etc.) As such, again, the VTU benefits from reduced load because, in this example, the continuous-type characteristic changes infrequently and need not be re-measured each time the VTU attempts (e.g., at one-second intervals in some examples) to detect whether the user's monitored driving behavior meets the requirements of a CDE record in the user's GD wish list. A person having ordinary skill in the art will recognize after review of the entirety disclosed herein that different continuous-type characteristics may benefit more from the register/de-register approach over the lengthened polling interval approach discussed above. Moreover, under the lengthened polling interval approach, a person having ordinary skill in the art after review of the entirety disclosed herein will recognize that it may be desirable to preconfigure a VTU with different interval designations for different continuous-type characteristics. For example, a "day of week" characteristic may be set at a one-hour polling interval, while a characteristic in the weather category may be set at a fifteen-minute polling interval.

Furthermore, under the register/de-register approach, in some examples, the sensor unit may require input values from the VTU before it can determine whether the value of the characteristic has changed and a notification to the VTU is required. In one such example, upon registration, the VTU may send the sensor unit regular updates of the GPS coordinates of the VTU. For example, the "zip code" characteristic is a continuous-type characteristic that requires the updated GPD coordinates of a vehicle to determine which zip code in which the vehicle is located. Upon the start of a trip, the sensor unit may provide the vehicle with the current zip code based on the current GPS coordinates of the vehicle. That zip code value may be stored at the vehicle in a variable in the memory unit of the VTU, and the VTU may use this stored zip code value for detecting whether the requirements of CDE records including the "zip code" characteristic have been met. Meanwhile, under the register/de-register approach, the sensor unit may continue to receive GPS coordinate updates from the VTU and perform the necessary processing to determine the zip code value corresponding to the updated GPS coordinates. Once the sensor unit determines that a zip code value has changed, the sensor unit will send a notification to the VTU including the updated "zip code" characteristic value. In response, the VTU may replace the stored zip code value in the variable (e.g., buffer variable) with the updated value. As a result, the VTU, on subsequent attempts to detect whether the requirements of CDE records including the "zip code" characteristic have been met, will use the stored, updated zip code value. A person having ordinary skill in the art will appreciate that a similar process may be applicable to other continuous-type characteristics listed in FIG. 5 and other characteristics.

In accordance with various aspects of the disclosure, after the user (e.g., user's account) is credited with sufficient GD points to exceed a predetermined threshold (e.g., 100 GD points earned for complying with a particular CDE record), the system (e.g., VTU and/or remote server) may generate a message. The message may be generated, in one example, after more than a threshold number of GD points have been earned by the user as a result of compliance with a particular CDE record. Once the threshold has been reached and the message generated, an updated threshold may be set for subsequent message generation (e.g., the threshold may be doubled or equivalently, the counter corresponding to the threshold may be reset.) In another example, the total GD points earned across all CDE records of a user's GD wish list may be aggregated in total and an appropriate message may be generated after a threshold amount of GD points is reached.

In one example, the message may be a positive message configured for perception in the user's vehicle, to promote good driving behavior. The VTU may include a speaker or other output device (e.g., in-car navigation display 110, smartphone display, etc.) to deliver the message to the user in the vehicle. The positive message may include information about the positive results achieved and/or identification of what user behavior contributed to those results. For example, the positive message may be an audible message to the user in the vehicle: "Your consistent gradual stops lower the chance of you being rear-ended by nearly one-half!" In another example, the message may state: "Your speed control on this on this curvy stretch of road is impressive. Great job staying under thirty miles per hours at all times. Keep it up!" In yet another example, the message may state: "You've done a commendable job limiting your night time driving to less than thirty hours for the month of August. Keep up the good work through September!" A person having ordinary skill in the art after review of the entirety disclosed herein will be able to readily identify what CDE record in a GD wish list may correspond to such generated messages, as well as other examples of messages that may be generated in response to other CDE record examples.

The positive message may be generated in an automated fashion by a remote server based on the characteristics in one or more CDE records in the user's good driving (GD) wish list. In an alternate embodiment, the message may be audio recordings by an expert team at an insurance company or other organization. In yet another embodiment, the message may be delivered via a social networking site (e.g., Facebook, LinkedIn, Orkut, Twitter, Google+, etc.) for display to the user as well as a community of other users. Such a public/non-private posting may further promote good driving behavior by showcasing a user's good driving and the positive results to his community of friends, family, and others. In yet another example, a moderator of the good driving program (e.g., an insurance company) may issue virtual medals or other virtual prizes to users for outstanding driving behavior. Likewise, real world prizes and discounts (e.g., discounts on an auto insurance premium) may be awarded to users based on accumulation of GD points or other factors related to the features disclosed herein. In contrast to an "accident free" discount awarded by some insurance companies to drivers, the discounts described herein may be based on more precise metrics that truly assess the good driving behavior of a user based on his/her own challenging good driving wish list. The features disclosed herein illustrate that merely avoiding accidents isn't necessarily always commensurate with a good driver deserving of auto insurance policy discounts.

In addition, the system 200 may assist in generating the message/feedback provided by the vehicle telematics unit (VTU) 216 to the user. For example, in some embodiments, the good driving analysis server 220 may create a positive message including a long-term positive consequence of a short term act (e.g., an act of good driving behavior). The server 220 may transmit the message to a VTU 216 such that the VTU may generate (in step 330) the message for perception by the user while in the vehicle 210. As such, the system 200 may provide the user with real-time in-vehicle feedback that shows the user the full long-term consequences of decisions he makes in the present time. For example, the long-term effect of a negative act (e.g., a person speeding) may be shown in terms of the cost of a speeding ticket, increased insurance premiums, and other future negative consequences. Moreover, the users also can be shown the greater likelihood of an accident that is a proximate cause of the user's behavior; a person engaging in a hard turn may be notified of the increased likelihood of an accident due to the hard turn and the potential damage that would ensue. In some examples, the user may be encouraged to continue good driving behavior with positive message about the full long-term, positive consequences of good driving decisions he makes in the present time. For example, while driving a vehicle, a user may be congratulated that his adherence to the speed limit in compliance with a CDE record in his GD wish list has resulted in his decreasing his chance of a speeding ticket by X percentage and the risk of a catastrophic vehicular crash by Y percent. Moreover, the message may include the monetary savings for the user in the long-term (e.g., over the next five years). As a result, the user may be encouraged to continue promoting his good driving behavior and engaging in compliance with his GD wish list.

In the same vein as the disclosure above, the system 200 may analyze the collected driving behavior data and other data, such as claims data, accident information, and cost data, to predict the increased/decreased probability of a vehicular incident based on various behaviors. Users can be shown the total costs (e.g., repair, wear and tear and potential police violations) or savings of their actions while they engage in the actions. The VTU 216 may be configured to generate messages that include such positive, long-term language when requirements of particular CDE records have been met. A person having ordinary skill in the art, after review of the entirety disclosed herein, will recognize that techniques exist for determining (e.g., by actuaries at insurance companies) the decreased probability of particular detrimental events by a change in the behavior that may lead to such events.

In addition, in an improvement over some conventional telematics systems, the systems disclosed herein may benefit, in some examples, from less distracting in-car feedback for the user. Since the positive message is generated after accumulation of a threshold quantity of GD points, the user isn't distracted by constant messages from the system. For example, some prior art telematics systems generate a real-time alert in a car each time poor driving behavior (e.g., extreme braking) is detected. The alert comes at a time when the driver is already driving poorly, and the distractions from in-car warnings likely only further distract an already flustered driver. In stark contrast, the systems disclosed herein generate positive messages after a user has driven well (i.e., in accordance with his good driving wish list) for more than a threshold amount. The positive reinforcement from the message may further promote good driving behavior. Moreover, the generated message may indicate a milestone reached by the user (e.g., you've obtained level ten based on your accumulated GD points) and motivate the user to achieve an even higher level, such as in a video game. In addition, positive messages are more likely to encourage a driver to continue working hard to achieve continued results, while negative alerts or warnings are likely to discourage a driver from getting behind the wheel of a vehicle in fear of being reprimanded by the system.

In accordance with aspects of the disclosure, the system 200 may generate a graphical map overlay showing GD points awarded at particular locations/areas. For example, a data store 227 may receive and store driving behavior data from a user's vehicle 210 and other users' vehicles 210*a-n*. The good driving analysis server 220 may analyze the collected data and other information to generate (in step 328) a graphical map overlay indicating GD points earned (or actually awarded) at particular areas on a geographic map. Based on the number of GD points being earned during a period of time at particular locations, the system may generate a graphical map (or graphical map overlay) that identifies areas where users are promoting good driving behavior by following their GD wish lists. Similar to how traffic is displayed on a graphical map (e.g., on a navigation device 169 display), the GD points earned at a particular location/area may be displayed on a map. The graphical map overlay may provide an indication of which locations include the safest drivers. The "good driving" overlay may have a similar look and feel to a traffic overlay as is conventionally seem on graphical maps, such as in a web browser or on a personal navigation device. Areas on the map may be shaded in red, orange, yellow, or green to indicate varying degrees of GD points awarded at particular locations/areas on the map. Red areas may indicate least GD points per vehicle while green represents the most. A user may view the overlay when requesting route directions from a navigation device 169 or other device (e.g., smartphone 141). The "good driving" overlay may assist a user in determining what best areas to travel so as to maximize interaction with those drivers that are pledging the most challenging good driving habits and achieving those CDE records. A person having ordinary skill in the art will appreciate that the number of GD points being earned during a period of time at particular locations may be normalized to take into account vehicle density and/or other factors. For example, the total number of GD points earned may be divided by the number of vehicles to obtain a normalized GD points per vehicle statistic.

In accordance with aspects of the disclosure, a computer-readable storage medium (e.g., non-transitory medium) storing computer-executable instructions for performing the steps depicted in FIG. 3A, FIG. 3B, and FIG. 3C and/or described in the present disclosure is contemplated. The computer-executable instructions may be configured for execution by a processing unit (e.g., processor 103 in computing device 101) and stored in a memory unit (e.g., memory 115 in computing device 101). Furthermore, as explained earlier, the computer-readable medium may be embodied in a non-volatile memory (e.g., in a memory in personal navigation device 167) or portable media (e.g., CD-ROM, DVD-ROM, USB flash, etc. connected to personal computing device 165).

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure. For example, although numerous examples above recite that the user/driver selects the characteristics and corresponding values that go into the CDE record, the disclosure also contemplates other users selecting the characteristics. For example, in some examples, a parent may select characteristics and create CDE records for their teenage driver's good driving wish list. In another example, a vehicle insurance provider may select characteristics and create CDE records for their customer's good driving wish list. In another example, a fleet manager may select characteristics and create CDE records for their employees' good driving wish lists. In yet another example, the process may be collaborative, such that the driver and another user or computing device may together select characteristics and create user-selected combinations.

We claim:

1. A computing system comprising:
a vehicle telematics unit (VTU) installed in a vehicle;
a processor; and
a memory storing computer-executable instructions, which when executed by the processor, cause the computing system to:
receive, from a user associated with the VTU, a list comprising one or more custom driving events, wherein a first custom driving event is associated with a geographical location and comprises a user-selected combination comprising (i) one or more characteristics of driving behavior, and (ii) user-provided values corresponding to the one or more characteristics of driving behavior;
assign an amount of points to the first custom driving event based on a model analyzing aggregated driving behavior of a plurality of drivers at the geographical location, wherein, in response to analyzing the aggregated driving behavior of the plurality of drivers, different amounts of points are assigned to the first custom driving event for different times of day based on a likelihood of good driving behavior at the different times of day;
transmit, to the VTU, the list;
receive, from the VTU, data indicating a number of points earned by the user at one or more geographical locations, the one or more geographical locations including the geographical location corresponding to the amount of points assigned to the first custom driving event, wherein the number of points earned is associated with the amount of points that are assigned to the first custom driving event based on the model analyzing aggregated driving behavior;
generate a graphical map comprising the one or more geographical locations and the number of points earned by the user at the one or more geographical locations; and
transmit the graphical map to a device associated with the user, wherein the VTU is associated with the user, and comprises a processing unit and a memory unit, the memory unit storing the transmitted list, the amount of points, and further storing computer-executable instructions, which when executed by the processing unit, cause the VTU to:
activate a first sensor unit associated with the VTU and corresponding to a first characteristic of driving behavior, responsive to determining that the one or more characteristics of driving behavior in the transmitted list comprise the first characteristic of driving behavior;
deactivate a second sensor unit associated with the VTU and corresponding to a second characteristic of driving behavior, responsive to determining that the one or more characteristics of driving behavior in the transmitted list do not comprise the second characteristic of driving behavior;
monitor the driving behavior of the user using at least the first sensor unit; and
credit, in response to detecting that the monitored driving behavior meets requirements corresponding to the user-provided values in the list, an account associated with the user with the amount of points.

2. The computing system of claim 1, wherein one or more of the first sensor unit and the second sensor unit comprise a water sensor, thermometer, GPS receiver unit, clock unit, accelerometer unit, onboard diagnostics speed sensor, onboard diagnostics odometer, onboard diagnostics pressure sensor, blink rate sensor, seat belt sensor, or microphone.

3. The computing system of claim 1, wherein the crediting the account occurs after the vehicle has traveled a predetermined distance while the vehicle telematics unit simultaneously detects that the monitored driving behavior meets the requirements corresponding to the user-provided values in the list.

4. The computing system of claim 1, wherein the deactivating the first sensor unit comprises powering off the first sensor unit.

5. The computing system of claim 1, wherein the crediting the account occurs after the vehicle has been traveling a predetermined amount of time while the vehicle telematics unit simultaneously detects that the monitored driving behavior meets the requirements corresponding to the user-provided values in the list, the vehicle telematics unit further comprising:
  a counter configured to count an amount of time the vehicle has traveled while the requirements corresponding to the user-provided values in the list have been met.

6. The computing system of claim 1, wherein the deactivating the first sensor unit comprises reducing a monitoring frequency of the first sensor unit.

7. The computing system of claim 1, wherein the one or more driving characteristics of the first custom driving event in the list comprise at least a time characteristic and a zip code characteristic.

8. The computing system of claim 1, wherein the one or more driving characteristics of the first custom driving event in the list comprise at least a speed characteristic and a braking characteristic.

9. The computing system of claim 1, wherein the memory unit further stores computer-executable instructions, which when executed by the processing unit, cause the VTU to generate, by the processing unit and based on an amount of credited points exceeding a predetermined threshold, a message for display to the user.

10. A computing system comprising:
  a vehicle telematics unit (VTU) installed in a vehicle;
  a processor; and
  a memory storing computer-executable instructions, which when executed by the processor, cause the computing system to:
    receive, from a user, a list comprising one or more custom driving events, wherein a first custom driving event is associated with a geographical location and comprises a user-selected combination comprising (i) a first characteristic of driving behavior and a first user-provided value corresponding to the first characteristic and (ii) a second characteristic of driving behavior and a second user-provided value corresponding to the second characteristic;
    assign an amount of points to the first custom driving event based on a model analyzing aggregated driving behavior of a plurality of drivers at the geographical location, wherein, in response to analyzing the aggregated driving behavior of the plurality of drivers, different amounts of points are assigned to the first custom driving event for different times of day based on a likelihood of good driving behavior at the different times of day;
    transmit the list and the amount of points to the VTU;
    receive, from the VTU, data indicating a number of points earned by the user at one or more geographical locations, the one or more geographical locations including the geographical location corresponding to the amount of points assigned to the first custom driving event, wherein the number of points earned is associated with the amount of points that are assigned to the first custom driving event based on the model analyzing aggregated driving behavior;
    generate a graphical map comprising the one or more geographical locations and the number of points earned by the user at the one or more geographical locations; and
    transmit the graphical map to a device associated with the user
  wherein the VTU comprises a processing unit and a memory unit, the memory unit storing the list, the amount of points, and computer-executable instructions, which when executed by the processing unit, cause the VTU to:
    activate a first sensor unit associated with the VTU and corresponding to a third characteristic of driving behavior, responsive to determining that the list comprises a user-provided value corresponding to the third characteristic of driving behavior;
    deactivate a sensor unit associated with the VTU and corresponding to a fourth characteristic of driving behavior, responsive to determining that the list does not comprise a user-provided value corresponding to the fourth characteristic of driving behavior; and
    monitor the driving behavior of the user using at least the first sensor unit.

11. The computing system of claim 10, wherein the first sensor unit comprises a GPS receiver unit, clock unit, accelerometer unit, onboard diagnostics speed sensor, or onboard diagnostics odometer.

12. The computing system of claim 10, wherein the one or more driving characteristics of the first custom driving event in the list comprise a time characteristic and a zip code characteristic.

13. The computing system of claim 10, wherein the VTU further comprises:
  a counter configured to count an amount of time or distance the vehicle has traveled while requirements corresponding to the user-provided values in the list have been met.

14. The computing system of claim 10, wherein deactivating the sensor unit comprises powering off the sensor unit.

15. The computing system of claim 10, wherein deactivating the sensor unit comprises reducing a monitoring frequency of the sensor unit.

16. A method comprising:
  receiving, by a computing system and from a user, a list comprising one or more custom driving events, wherein a first custom driving event is associated with a geographical location and comprises a user-selected combination comprising (i) one or more characteristics of driving behavior, and (ii) user-provided values corresponding to the one or more characteristics of driving behavior;
  assigning, by the computing system, an amount of points to the first custom driving event based on a model analyzing aggregated driving behavior of a plurality of drivers at the geographical location, wherein, in response to analyzing the aggregated driving behavior of the plurality of drivers, different amounts of points are assigned to the first custom driving event for different times of day based on a likelihood of good driving behavior at the different times of day;

transmitting, by the computing system and to a vehicle telematics unit coupled to the computing system, the list and the amount of points, wherein the vehicle telematics unit is installed in a vehicle associated with the user, and wherein the vehicle telematics unit:

activates a first sensor unit associated with the vehicle telematics unit and corresponding to a first characteristic of driving behavior, responsive to determining that the one or more characteristics of driving behavior in the transmitted list comprise the first characteristic of driving behavior; and deactivates a second sensor unit associated with the vehicle telematics unit and corresponding to a second characteristic of driving behavior, responsive to determining that the one or more characteristics of driving behavior in the transmitted list do not comprise the second characteristic of driving behavior;

receiving, from the vehicle telematics unit, data indicating a number of points earned by the user at one or more geographical locations, the one or more geographical locations including the geographical location corresponding to the amount of points assigned to the first custom driving event, wherein the number of points earned is associated with the amount of points that are assigned to the first custom driving event based on the model analyzing aggregated driving behavior;

generating a graphical map comprising the one or more geographical locations and the number of points earned by the user at the one or more geographical locations; and transmitting the graphical map to a device associated with the user.

17. The method of claim 16, wherein deactivating the second sensor unit comprises powering off the second sensor unit.

18. The method of claim 17, wherein deactivating the second sensor unit comprises reducing a monitoring frequency of the second sensor unit.

19. The method of claim 17, wherein the aggregated driving data comprises accident information for the plurality of drivers at the geographical location.

20. The method of claim 16, wherein the vehicle telematics unit further:

monitors the driving behavior of the user using at least a first sensor unit; and credits, in response to detecting that the monitored driving behavior meets requirements corresponding to the user-provided values in the list, an account associated with the user with the amount of points.

* * * * *